United States Patent
Golitschek Edler Von Elbwart et al.

(10) Patent No.: US 9,237,522 B2
(45) Date of Patent: Jan. 12, 2016

(54) ACTIVE BANDWIDTH INDICATOR FOR POWER-SAVING UES

(71) Applicant: PANASONIC CORPORATION, Osaka (JP)

(72) Inventors: Alexander Golitschek Edler Von Elbwart, Darmstadt (DE); Akihiko Nishio, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/357,438

(22) PCT Filed: Nov. 6, 2012

(86) PCT No.: PCT/EP2012/071922
§ 371 (c)(1),
(2) Date: May 9, 2014

(87) PCT Pub. No.: WO2013/072222
PCT Pub. Date: May 23, 2013

(65) Prior Publication Data
US 2014/0254452 A1 Sep. 11, 2014

(30) Foreign Application Priority Data

Nov. 18, 2011 (EP) .................................... 11189784

(51) Int. Cl.
*H04W 52/02* (2009.01)
*H04L 12/26* (2006.01)
(Continued)

(52) U.S. Cl.
CPC .......... *H04W 52/0219* (2013.01); *H04W 28/20* (2013.01); *H04W 52/0216* (2013.01);
(Continued)

(58) Field of Classification Search
CPC . H04W 52/02; H04W 28/20; H04W 52/0219; H04W 72/0453; H04W 72/005; H04W 48/08; H04L 12/26; H04L 1/1812; H04L 5/0007
USPC .................................. 370/311, 252, 329, 337
See application file for complete search history.

(56) References Cited

U.S. PATENT DOCUMENTS 6,466,544 B1 * 10/2002 Sen .................... H04W 72/0453
370/231
2010/0157910 A1 * 6/2010 Nentwig ............... H04L 5/0007
370/329

(Continued)

FOREIGN PATENT DOCUMENTS

WO 2010/118382 A1 10/2010

OTHER PUBLICATIONS

International Search Report for Application No. PCT/EP2012/071922 dated Jan. 30, 2013.

*Primary Examiner* — Chi H Pham
*Assistant Examiner* — Shailendra Kumar
(74) *Attorney, Agent, or Firm* — Pearne & Gordon LLP

(57) ABSTRACT

The present invention relates to a terminal and a base station, and to a receiving and transmitting method to be performed at the terminal and the base station, respectively. In particular, the present invention relates to power consumption reduction by providing two operation bandwidths for a terminal, one being a cell-bandwidth, a bandwidth in which the cell may operate and the other one is a bandwidth, lower than the cell-bandwidth and called power-saving bandwidth. The terminal may perform the initial cell search including reception of the system information in the cell bandwidth and perform other reception/transmission/monitoring operation(s) in the power-saving bandwidth. Accordingly, a low-cost terminal implementation is enabled, which is particularly advantageous for the machine communication terminals.

14 Claims, 7 Drawing Sheets

(51) Int. Cl.
*H04W 28/20* (2009.01)
*H04L 1/18* (2006.01)
*H04L 5/00* (2006.01)
*H04W 72/00* (2009.01)
*H04W 48/08* (2009.01)
*H04W 72/04* (2009.01)
*H04W 76/04* (2009.01)
*H04W 88/02* (2009.01)

(52) U.S. Cl.
CPC ......... *H04W52/0293* (2013.01); *H04L 1/1812* (2013.01); *H04L 5/0007* (2013.01); *H04W 48/08* (2013.01); *H04W 72/005* (2013.01); *H04W 72/0453* (2013.01); *H04W 76/048* (2013.01); *H04W 88/02* (2013.01); *Y02B 60/50* (2013.01)

(56) References Cited

U.S. PATENT DOCUMENTS

| 2011/0070905 | A1* | 3/2011 | Kazmi | H04W 72/005 455/507 |
|---|---|---|---|---|
| 2011/0085457 | A1* | 4/2011 | Chen | H04L 1/1812 370/252 |
| 2011/0255425 | A1* | 10/2011 | Pikkarainen | H04W 48/08 370/252 |

* cited by examiner

ACTIVE BANDWIDTH INDICATOR FOR POWER-SAVING UES

FIELD OF THE INVENTION

The present invention relates to power-saving terminals for a communication system using a multicarrier modulation. In particular, the present invention relates to reducing the power consumption of such terminals.

BACKGROUND OF THE INVENTION

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3*GPP TR* 25.913, *"Requirements for evolved UTRA (E-UTRA) and evolved UTRAN (E-UTRAN),"* v8.0.0, January 2009, (available at http://www.3gpp.org/ and incorporated herein by reference). The Downlink will support data modulation schemes QPSK, 16QAM, and 64QAM and the Uplink will support BPSK, QPSK, 8PSK and 16QAM.

LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames 100, each of which is divided into two downlink slots, one of which is shown in FIG. 1 as 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB 130 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 130 consists of $N_{symb}^{DL} \times N_{sc}^{RB}$ resource elements corresponding to one slot in the time domain and 180 kHz in the frequency domain (further details on the downlink resource grid can be found, for example, in 3*GPP TS* 36.211, *"Evolved universal terrestrial radio access (E-UTRA); physical channels and modulations (Release 8)"*, version 8.9.0, December 2009, Section 6.2, freely available at www.3gpp.org. which is incorporated herein by reference). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions, as also illustrated in FIG. 3.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10 MHz) or in units of resource blocks, for the downlink case the cell bandwidth can equivalently expressed as 10 MHz or $N_{RB}^{DL}=50$ RB.

Before a UE can access an LTE cell, it performs a cell search procedure. This procedure enables the UE to determine the time and frequency parameters which are necessary to demodulate the downlink and to transmit uplink signals with the correct timing.

The first phase of the cell search includes an initial synchronization. Accordingly, the UE detects an LTE cell and decodes all the information required for registering to the detected cell. The procedure makes use of two physical signals which are broadcast in the central 62 subcarriers of each cell, the primary and secondary synchronization signals (PSS and SSS, respectively). These signals enable time and frequency synchronization. Their successful detection provides a UE with the physical cell-ID, cyclic prefix length, and information as to whether FDD or TDD is employed. In particular, in LTE, when a terminal is switched on, it detects the primary synchronization signal which for FDD is transmitted in the last OFDM symbol of the first time slot of the first subframe (subframe 0) in a radio frame (for TDD the location is slightly different, but still well-determined). This enables the terminal to acquire the slot boundary independently of the chosen cyclic prefix selected for the cell. After the mobile terminal has found the 5 millisecond timing (slot boundaries), the secondary synchronization signal is looked for. Both the PSS and SSS are transmitted on 62 of the 72 reserved subcarriers around the DC carrier. In the next step, the UE shall detect a physical broadcast channel (PBCH) which, similarly to the PSS and SSS is mapped only to the central 72 subcarriers of a cell. The PBCH contains the Master Information Block (MIB) including information about the system resources. In LTE up to Release 10, MIB had a length of 24 bits (14 bits of which are currently used and 10 bits are spare). MIB includes the following parameters:

Downlink system bandwidth,

Physical HARQ Indicator Channel (PHICH) structure, and 8 most significant bits of the System Frame Number (SFN)

After successful detection of the master information block (MIB) which includes a limited number of the most frequently transmitted parameters essential for initial access to the cell, the terminal activates the system bandwidth, meaning that it has to be able to receive and detect signals across the indicated downlink system bandwidth. After acquiring the downlink system bandwidth, the UE may proceed with receiving further required system information on the so-called System Information Blocks (SIB). In LTE Release 10, SIB Type 1 to SIB Type 13 are defined, carrying different information elements required for certain operations. For instance, in case of FDD the SIB Type 2 (SIB2) includes the UL carrier frequency and the UL bandwidth.

The various SIBs are transmitted on a Physical Downlink Shared Channel (PDSCH) and thus (cf. details to PDSCH and PDCCH below) the respective allocations are assigned by a Physical Downlink Control Channel (PDCCH). Before the terminal (UE) is able to correctly detect such (or any) PDCCH, it needs to know the downlink system bandwidth from the MIB.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:

Localised Virtual Resource Block (LVRB)

Distributed Virtual Resource Block (DVRB)

In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity. It may be noted that data that is targeting multiple receivers at the same time is usually mapped in the distributed fashion, as the probability that all receivers provide a sufficiently large spectral efficiency on the same localized resource blocks generally decreases with an increasing number of receivers.

In 3GPP LTE Release 8 there is only one component carrier in uplink and downlink. Within one DL subframe, the first 1 to 4 OFDM symbols are used for downlink control channel and downlink signal transmission (LTE control region). Downlink control signaling is basically carried by the following three physical channels:

Physical control format indicator channel (PCFICH) for indicating the number of OFDM symbols used for control signaling in a sub-frame (the size of the control channel region). For $N_{RB}^{DL}>10$, the PCFICH carries the control format indicator (CFI), which indicates a length of either 1, 2, or 3 OFDM symbols, while for $N_{Rb}^{DL}\leq10$, the CFI indicates a length of either 2, 3, or 4 OFDM symbols.

Physical hybrid ARQ indicator channel (PHICH) for carrying the downlink ACK/NACK associated with uplink data transmission. The duration of PHICH, the number of OFDM symbols used for PHICH, is configured by higher layer. For normal PHICH, the duration is 1 OFDM symbol. For extended PHICH, the duration is 2 to 3 OFDM symbols. The duration of PHICH puts a lower limit on the size of the DL control region determined from the PCFICH value.

Cell-specific reference signals (CRS) are transmitted on one or several of antenna ports 0 to 3. In a normal subframe, CRS is distributed within the subframe across the whole bandwidth. In an MBSFN subframe, CRS shall only be transmitted in the non-MBSFN region, DL control region, of the MBSFN subframe.

Physical downlink control channel (PDCCH) for carrying downlink scheduling assignments and uplink scheduling assignments.

The PCFICH is sent from a known position that depends on the downlink system bandwidth value within the control signaling region of a downlink sub-frame using a known predefined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted within the OFDM symbols according to the CFI value that is usually indicated by PCFICH in the sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimize the overhead for such an indication, thereby decreasing the control overhead to data ratio for a transmission. The size of RBG is currently specified to be 1, 2, 3, or 4 resource blocks, depending on the system bandwidth, in particular, on $N_{RB}^{DL}$. Further details of RBG mapping for PDSCH in LTE Release 8 may be found in 3*GPP TS* 36.213 *"Evolved Universal terrestrial Radio Access (E-UTRA); Physical layer procedures"*, v8.8.0, September 2009, Section 7.1.6.1, freely available at www.3gpp.org and incorporated herein by reference.

The UE shall monitor a set of PDCCH candidates on the serving cell for control information in every non-DRX subframe, where monitoring implies attempting to decode each of the PDCCHs in the set according to all the monitored downlink control information (DCI) formats. A DCI represents the required L1/L2 control information, for which more information can be found in 3*GPP TS* 36.212, *"Evolved Universal terrestrial Radio Access (E-UTRA)*; *Multiplexing and Channel Coding"*, ver. 8.8.0, December 2009, Section 5.3.3, freely available at www.3gpp.org and incorporated herein by reference. The set of PDCCH candidates to monitor are defined in terms of search spaces.

UE monitors two types of search space: UE specific search space and common search space. Both UE specific search space and common search space consist of a generally different number of candidates for different aggregation levels defined by aggregating generally different CCEs.

PDCCH for system information is transmitted in common search space, so that all the UEs can receive system information by monitoring common search space.

Physical downlink shared channel (PDSCH) is used to transport user data. PDSCH is mapped to the remaining OFDM symbols within one sub-frame after PDCCH (with the possible exception of a limited number of resource elements, as indicated previously). The PDSCH resources allocated for one UE are in the units of resource block for each sub-frame. In LTE, DL data region starts after the DL control region within one subframe. In DL data region, CRS, PDSCH and—if configured—corresponding UE-specific or demodulation reference signals (DM-RS) are transmitted.

FIG. 3 shows an exemplary mapping of PDCCH 331-333 and PDSCH 350 within a sub-frame. The first three (in this example) OFDM symbols form a control channel region 390 (PDCCH region) and are used for L1/L2 control signaling. The remaining eleven OFDM symbols form data channel region (PDSCH region, in FIG. 3 only first 4 are shown, belonging to the first slot) and are used for transport of physical layer data (which may be control information of higher layers or user data). Within a resource block pairs of all sub-frames, cell-specific reference signals, so-called common reference signals 340 (CRS), are transmitted on one or several antenna ports 0 to 3.

Moreover, the sub-frame also includes UE-specific reference signals, so-called demodulation reference signals 380 (DM-RS) used by the user equipment for demodulating the PDSCH. The DM-RS are only transmitted within the resource blocks in which the PDSCH is allocated for a certain user equipment. In order to support downlink multiple input/multiple output (MIMO) with DM-RS, up to eight DM-RS layers are defined meaning that at most, MIMO of eight layers is supported in LTE Release 10. FIG. 4 shows only the case of 4 simultaneous employed DM-RS layers.

In September 2009 the 3GPP Partners made a formal submission to the ITU proposing that LTE Release 10 & beyond (LTE-Advanced) be evaluated as a candidate for IMT-Advanced. The ITU has coined the term IMT Advanced to identify mobile systems whose capabilities go beyond those of IMT 2000. In order to meet this new challenge, 3GPPs Organizational Partners have agreed to widen 3GPP's scope to include systems beyond 3G. In 3GPP, further advancements for E-UTRA (LTE-Advanced) should be studied in accordance with: 3GPP operator requirements for the evolution of E-UTRA and the need to meet/exceed the IMT-Advanced capabilities. The expectancy is that Advanced E-UTRA should provide substantially higher performance compared to what is expected to be the IMT-Advanced requirements in ITU-R.

LTE-A Rel.10 work started from March 2010 and was already stable in June 2011. The major features included in LTE-A Rel.10 included Carrier Aggregation, enhanced DL MIMO, UL MIMO, relay and etc.

According to 3*GPP TS* 36.300 v.10.2.0, *"Evolved Universal Terrestrial Radio Access (E-UTRA) and Evolved Universal Terrestrial Radio Access Network (E-UTRAN)*; *Overall description"*, December 2010, Section 5.5, in Carrier Aggregation (CA), two or more Component Carriers (CCs) are aggregated in order to support wider transmission bandwidths up to a total of 100 MHz. A UE may simultaneously receive or transmit on one or multiple CCs depending on its capabilities. It is possible to configure a UE to aggregate a different number of CCs in the UL and the DL.

The number of DL CCs that can be configured depends on the DL aggregation capability of the UE;

The number of UL CCs that can be configured depends on the UL aggregation capability of the UE;

It is not possible to configure a UE with more UL CCs than DL CCs.

When CA is configured, a UE only has one RRC connection with the network. At RRC connection reestablishment/handover, one serving cell provides the NAS mobility information and the security input. The serving cell is referred to as Primary Cell (PCell). In the downlink, the carrier corresponding to the PCell is Downlink Primary Component Carrier (DL PCC) while in the uplink it is Uplink Primary Component Carrier (UL PCC).

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas. A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay.

LTE-A Release 11 work started from September 2011. The major features of LTE-A Release 11 include LTE carrier aggregation enhancements, Further Enhanced Non CA-based ICIC (inter-cell interference coordination) for LTE, Coordinated Multi-Point Operation (COMP) for LTE—Downlink and etc. Besides, LTE-A Release 11 also includes studies on Coordinated Multi-Point operation (CoMP) for LTE, Enhanced Uplink Transmission for LTE, further Downlink MIMO enhancements for LTE-Advanced.

During the study on CA enhancement, CoMP and DL MIMO, current PDCCH defined in Releases 8-10 shows some disadvantages: Beamforming or spatial multiplexing is not possible, frequency scheduling gain with localized allocation is not possible, because of only distributed DCI transmission is supported and frequency ICIC (Inter-Cell Interference Coordination) is not possible, because of random REG allocation among cells. In order to improve the situation, an enhanced PDCCH (E-PDCCH) is worked on, which would avoid the above problems.

A possibility provided by the LTE in order to improve battery lifetime is the discontinuous transmission (DTX) and reception (DRX). In order to provide a reasonable battery consumption of the terminal (UE), LTE Rel-8/9 as well as Rel-10 provide a concept of discontinuous reception (DRX). Accordingly, the terminal does not have to regularly monitor the control channels but rather can switch off the transmission and the reception over long periods and needs to activate the transceiver only at predefined or required time instances.

The following terms (parameters) describe the way DRX works:
- "on-duration": duration in downlink subframes that the UE waits for after waking up from DRX to receive PDCCHs. If the UE successfully decodes a PDCCH, the UE stays awake and starts the inactivity timer;
- "inactivity-timer": duration in downlink subframes that the UE waits to successfully decode a PDCCH, from the last successful decoding of a PDCCH. When PDCCH is not successfully decoded without the inactivity period, the UE re-enters DRX. The UE shall restart the inactivity timer following a single successful decoding of a PDCCH for a first transmission only (not for retransmissions); and
- "active-time": total duration that the UE is awake. This includes the "on-duration" of the DRX cycle, the time UE is performing continuous reception while the inactivity timer has not expired and the time UE is performing continuous reception while waiting for a DL retransmission after one hybrid ARQ (HARQ) round trip time (RTT). Based on the above, the minimum Active Time (here also called "active-time") is of length equal to on-duration, and the maximum is undefined (infinite);

There is only one DRX cycle per UE. All aggregated component carriers follow this DRX pattern.

In order to allow for further battery saving optimization, activation and deactivation of component carriers is introduced. Accordingly, a DL CC could be in one of the following three states: non-configured, configured but deactivated or active. When a DL CC is configured but deactivated, the UE does not need to receive the corresponding PDCCH or PDSCH and is also not required to perform CQI measurements for that CC. Conversely, when a downlink CC is active, the UE shall receive PDSCH and PDCCH (if present, transmitted), and is expected to be able to perform CQI measurements. After the configuration of the component carriers, in order to have PDCCH and PDSCH reception on the DL component as described above, the DL CC needs to be transitioned from the configured but deactivated state to the active state.

In the uplink however, a UE is always required to be able to transmit on PUSCH on any configured uplink CC when scheduled on the corresponding PDCCH (there is no explicit activation of uplink CCs).

In the past releases, semi-persistent scheduling (SPS) was introduced in order to reduce control channel overheads for applications that require persistent radio resource allocation such as voice over IP. SPS therefore introduces a persistent allocation of the physical resource blocks which a user should decode on the downlink or which he can transmit on the uplink. Up to now, however, the SPS feature is not very widely used.

Without SPS, in the downlink and uplink, eNB dynamically allocates resources to UEs at each TTI via the L1/L2 (layer 1/layer 2) control channel(s) (PDCCH) where the UEs are addressed via their specific C-RNTIs. TTI is a transmission time interval which is a basic timing unit of the transmission. C-RNTI is a cell radio network temporal identity, which uniquely identifies a UE. The cyclical error check (CRC) of a PDCCH is masked with the addressed UE's C-RNTI. Only a UE with a matching C-RNTI can decode the PDCCH content correctly resulting in a positive CRC check. This kind of PDCCH signaling is also referred to as "dynamic grant". A UE monitors at each TTI the L1/L2 control channel(s) for a dynamic grant in order to find a possible allocation (DL and UL) it is assigned to.

In addition, E-UTRAN can allocate uplink/downlink resources semi-persistently. When required, retransmissions are explicitly signaled via the L1/L2 control channel(s). Since retransmissions are scheduled, this kind of operation is referred to as semi-persistent scheduling (SPS). The benefit is that PDCCH resources for initial HARQ transmissions are saved. One example for a service, which might be scheduled by semi-persistent scheduling is voice over IP (VoIP). Every 20 ms a VoIP packets is generated by the speech codec during a talk-spurt. Therefore the eNB could allocate uplink or respectively downlink resources persistently every 20 ms, which could be then used for the transmission of the VoIP packets. In general, SPS is beneficial for services with a predictable traffic behavior, such as services with a constant bit rate, where the packet arrival time is periodic.

A UE also monitors the PDCCHs in subframe where it has been allocated resources persistently. A dynamic grant, PDCCH with a C-RNTI masked CRC, can override a semi-persistent allocation. In case the UE finds its C-RNTI on the L1/L2 control channel(s) in the sub-frames where the UE has a persistent resource(s) assigned, this L1/L2 control channel allocation overrides the persistent allocation for that TTI and the UE does follow the dynamic grant. When UE does not find a dynamic grant it will transmit and/or receive according to the persistent allocation.

The configuration of SPS is performed by RRC signaling. For example, the periodicity of the semi-persistent allocation is signaled within RRC. The activation of a semi-persistent allocation and also the exact timing as well as the physical resources and transport format parameters are sent via PDCCH signaling. Once SPS is activated, UE follows the semi-persistent allocation according to the activation PDCCH with the configured periodicity.

In order to distinguish a dynamic PDCCH from a PDCCH that activates SPS, also referred to as SPS activation PDCCH, a separate identity is introduced. Basically the CRC of an SPS activation PDCCH is masked with this additional identity which is referred to as SPS C-RNTI. The size of the SPS C-RNTI is 16 bits, which is the same as the normal C-RNTI. Furthermore, the SPS C-RNTI is also UE specific, each UE configured for SPS is allocated a unique SPS C-RNTI. In case UE detects an SPS activation PDCCH, it will store the PDCCH content and apply it every SPS interval, periodicity signaled via RRC. Retransmissions of an SPS allocation are also signaled using the SPS C-RNTI.

Similarly to the activation of SPS, eNB can also deactivate the semi-persistent scheduling. As for the activation, also the deactivation of SPS resource (also denoted SPS resource release), is signaled by using a PDCCH.

Another improvement of Release 11 has been agreed as a working item for standardization and relates to providing low cost machine type communication (MTC) terminals based on LTE. Moreover, LTE RAN enhancements for diverse data applications are under study. The machine type communication traffic profiles include sporadic data access for exchange of relatively small data amounts. Such a type of communication is particularly relevant for applications which require always-on connectivity, such as smart phones, sporadic access for the purpose of checking e-mails or social network updates. The aim of the working item is to identify and specify mechanisms at the radio access network level that enable enhancing the ability of the LTE to handle diverse traffic profiles. In particular, the aim is to reduce the costs and complexity of terminals in order to extend the battery life. The machine type communication traffic is in general delay insensitive data traffic in which the terminals and/or eNodeB can wait for some time until the data is delivered. Such traffic may be, for instance, the planned data traffic including regular updates such as measurements or other reports. The amount of data exchange is typically rather small and can be delivered in few subframes. For instance, such data may be SMS type messages for controlling or reporting by a machine.

It is suggested that the MTC terminals shall only operate in the 1.4 MHz band only and shall be only addressable by E-PDCCH since the PDCCH is incompatible for different bandwidths. Addressing by E-PDCCH means that the DCI is transmitted in the PDSCH region. E-PDCCH is an enhanced PDCCH channel under study for release 11, which should provide more efficient and robust transmission.

The current initial synchronization procedure works only for all possible downlink system bandwidth sizes if the UE is capable of processing all the possible downlink system bandwidths. Up to the PBCH detection and reception it would be sufficient for the UE to support only a 1.4 MHz cell since the mapping of PSS/SSS to the central 62 subcarriers and the mapping of PBCH to the central 72 subcarriers enables the detection of these signals and channel independent of the actual downlink bandwidth of the cell. However, this bandwidth is neither sufficient to complete the synchronization procedure (for instance, receiving the various SIB Type messages (on PDSCH)) nor to commence the regular operation in the cell (for instance, by completing the connection setup and starting monitoring the PDCCH and possibly receive data on PDSCH), nor to initiate a random access procedure.

In other words, at the latest after the detection of the PBCH, the UE needs to enable the full downlink system bandwidth processing chain, in a case without carrier aggregation up to 20 MHz (or 100-110 PRBs) need to be operable and within the capability of the UE hardware and software.

3GPP contribution R1-112669, *"On support of low-cost MTC terminals with reduced Tx/Rx bandwidths"*, August 2011, RAN1 meeting no. 66, freely available on www.3gpp.org suggests continuous (permanent) operation of the terminal at using a small operational bandwidth in a larger system bandwidth cell. In particular, it is proposed to define a UE with a narrower receiving (Rx)/transmitting (Tx) bandwidth than the eNodeB's Tx/Rx bandwidth. The following features are envisaged to support a 1.4 MHz capable MTC UE to access an eNodeB with a wider bandwidth:

Special PDCCHs are introduced and used for MTC UEs. The PDCCHs are transmitted within the central 1.4 MHz-wide part of DL carrier. E-PDCCH on PUSCH region may be used for MTC UEs.

System Information Block of the eNodeB for MTC UEs are separately transmitted from those for legacy UEs and within the central 1.4 MHz wide part. Paging signals for MTC UEs are also transmitted within the central part.

Some of the reserved bits in PBCH may be used for MTC UEs, or X-PBCH might be transmitted within the central 1.4 MHz-wide part.

As located on the both edges of UL carrier, legacy PUCCHs are not used for transmission of UCI from MTC UEs. Alternatively, PUSCH is used for the UCI transmission.

All PRACH slots are located in the central 1.4 MHz-wide part. Alternatively, different PRACH configurations are configured for legacy UEs and MTC UEs.

As can be seen, each of these points is introducing a new functionality for the UE and requires the corresponding support at the eNodeB side as well. Furthermore, the eNodeB would be tasked to manage the collision-free operation of channels and signals between such proposed MTC UEs and "regular" UEs.

According to R1-112669, the PDCCH is transmitted within the central 1.4 MHz-wide part of the downlink carrier. E-PDCCH or PDSCH region may be used for MTC UEs. Shared channel is only transmitted within the central 1.4 MHz wide part of the downlink carrier. Thus, the eNodeB scheduling and link adaptation has to manage coexistence of different bandwidth capabilities. The frequency scheduling flexibility for an MTC PDSCH and PUSCH is extremely limited, since only central 1.4 MHz are available. This may cause congestion of the central bandwidth in the case of simultaneous access by multiple MTC UEs on the PDCCH as well as PDSCH. The relative control signaling overhead is also substantial, since large packets need to be segmented and transmitted and consequently indicated by control signaling in multiple subframes.

The main task of the present invention is to enable an operation of a low-power-consumption device that is capable of integrating into the existing radio access network without major modifications, particularly for existing start-up and device attachment/registration procedures, while still able to operate at low power consumption during times of little or no data activity. At the same time, the target is to simplify the eNodeB's job of handling and coordinating the resources and transmissions to and from "regular" UEs and low-cost UEs.

SUMMARY OF THE INVENTION

Especially for the MTC applications, it will be beneficial to provide mechanisms capable of energy efficient operation. This may be performed on one hand by addressing energy saving in the base band part, such as forward error correction decoding or performing the fast Fourier transform and its inverse for the purposes of OFDM. On the other hand, further improvements of DTX may be beneficial.

In view of the above, the aim of the present invention is to provide an efficient operation approach for further reducing the power consumption of terminals in a communications system employing multicarrier modulation.

This is achieved by the features of independent claims.

Advantageous embodiments of the invention are subject to the dependent claims.

It is the particular approach of the present invention to operate in a wider bandwidth for the initial terminal operations including cell search and/or connection setup or reconfiguration procedure and to operate in a lower bandwidth for another type of operation.

This approach enables backward compatibility with networks which transmit their system information on the wider bandwidth and expect terminals to be capable of receiving it. On the other hand, it enables the terminal to save power by operating on the lower bandwidth for another operation.

In accordance with a first aspect of the present invention, a method is provided for receiving signals in a cellular communication system with multiple subcarriers, the method being performed at a terminal and comprising the following steps: operating on a cell bandwidth with a first number of subcarriers for receiving system information transmitted by a base station including information about an cell bandwidth and operating on a power-saving bandwidth with a second number of subcarriers smaller than the first number of subcarriers for receiving a physical control channel.

It is noted that the term operation here includes monitoring of resources for receiving physical control channel(s) and/or receiving physical data channel(s) and/or transmitting control information or data. The first number of subcarriers includes subcarriers that may be used to transmit the system information. The system information may include information indicating the effective bandwidth of the cell, the bandwidth the resources in downlink may be allocated in, and for the LTE system particularly encompasses information elements that are conveyed in one of SIB Type 1 to 13.

Preferably, the method further comprises a step of switching the operation of the terminal between the cell bandwidth and the power-saving bandwidth, for instance, upon a predetermined event. The switching is typically characterized by operating on a first bandwidth until an event and operating on a second bandwidth immediately after or at latest starting after a defined time interval after said event.

In particular, the terminal may further perform detecting of a downlink control information for uplink or downlink resource assignments, wherein when the terminal is in the power-saving bandwidth operation, the length of the assignment information is smaller than when the terminal is in the cell bandwidth operation.

In accordance with an embodiment of the present invention, the method may further comprise the steps of: receiving an active bandwidth indicator; and upon receiving the active bandwidth indicator, switching the terminal operation bandwidth from the power-saving bandwidth to the cell bandwidth. The active bandwidth indicator may be transmitted to the terminal from the base station as a command to resume the operation on the cell bandwidth. Preferably, the active bandwidth indicator is conveyed (in particular, transmitted by a base station and received by a terminal) on a physical downlink control channel and is specific for a terminal. However, the present invention is not limited thereto and the active bandwidth indicator may also be common for the entire cell and transmitted within the system information.

The active bandwidth indicator may advantageously indicate at least one of:
 a command for the terminal or the group of terminals to change operation from the power saving bandwidth to cell bandwidth or vice versa;
 a command for the terminal or the group of terminals to operate on the power saving bandwidth or cell bandwidth; this command differs from the previous case in that it indicates the bandwidth to be operated on after the reception of said command. It may result similarly to the previously defined command to changing the operation bandwidth. However, it does not necessarily indicate the change of the operation state. For instance, if the UE is already in an appropriate state, it does not have to change the operation bandwidth.
 downlink and/or uplink bandwidth for indicating the bandwidth on downlink and/or uplink, respectively, to which the terminal or the group of terminals shall change the operation, or for indicating the bandwidth to be operated on after the reception of said command.

The step of switching may be performed upon at least one of the following events:
 finishing of connection establishment procedure for connecting the terminal to the communication network including configuring physical downlink control channel for the terminal;
 waking up from a discontinuous reception after inactivity time period or expiry of the inactivity timer in the discontinuous reception; and/or
 expiry of a predetermined time period.

The predetermined time period may be specified by higher layers, for instance by the RRC protocol. Particularly advantageous may be the cooperation between the present invention and the discontinuous reception.

In accordance with another aspect of the present invention, a method is provided for transmitting signals in a cellular communication system with multiple subcarriers, the method being performed at a base station and comprising the steps of: monitoring usage of resources in a cell of the communication system; in accordance with the monitoring, judging whether and/or which terminal shall operate on a cell bandwidth with a first number of subcarriers or on a power-saving bandwidth including a second number with a second number of subcarriers smaller than the first number of subcarriers, and transmitting an active bandwidth indicator to a terminal judged to switch from the power-saving bandwidth to the cell bandwidth.

In accordance with another aspect of the present invention, a communication terminal is provided for receiving signals in a cellular communication system with multiple subcarriers. The terminal includes a cell-bandwidth operation unit for operating on a cell bandwidth with a first number of subcarriers for receiving system information transmitted by a base station including information about the cell bandwidth; and a power-saving-bandwidth unit for operating on a power-saving bandwidth with a second number of subcarriers smaller than the first number of subcarriers for receiving a physical control channel.

It is noted that the term "communication terminal" or "terminal" here is not to limit the invention to usage in user equipments. The terminal may also be a relay node or a machine acting automatically, without control of the user such as machine-type communication terminals. In general, the present invention is applicable to any apparatus receiving information from a base station. It is particularly advantageous in terminals which need reduced power consumption.

In accordance with another aspect of the present invention, a base station for transmitting signals in a cellular communication system with multiple subcarriers, the base station comprising: a resource control unit for monitoring usage of resources in a cell of the communication system; a judging unit for judging based on input from the resource control unit whether and/or which terminal shall operate on a cell bandwidth with a first number of subcarriers or on a power-saving bandwidth including a second number with a second number of subcarriers smaller than the first number of subcarriers, and a transmitting unit for transmitting an active bandwidth indicator to a terminal judged to switch from the power-saving bandwidth to the cell bandwidth.

In the context of LTE-like systems, the cell bandwidth preferably includes more than 72 subcarriers and the power-saving bandwidth includes less than or equal to 72 subcarriers. In particular, the cell bandwidth may correspond to the 20 MHz operation and the power-saving bandwidth may correspond to the 1.4 MHz operation.

It is noted that the bandwidth of 1.4 MHz is an exemplary value based on the current considerations and features of LTE, where 1.4 MHz equivalent to 6 RBs is the smallest supported bandwidth. However, the present invention is neither limited to the LTE system only nor is it limited to the value of 1.4 MHz. In particular, it may be more efficient to provide a higher bandwidth for the power-saving bandwidth operation. For instance, 15 RBs equivalent to 180 subcarriers corresponding to ca. 3 MHz may be another example value for the power-saving bandwidth. For the 15 RB case, the efficiency is higher than for the 6 RB case: 15 RBs=180 usable subcarriers in LTE occupy 2.7 MHz within the entire bandwidth of 3 MHz, where the additional 0.3 MHz are required as guard bands to reduce the out-of-band emissions; usually it can be assumed that the total guard band is equally distributed above and below the cell bandwidth, in this case a 0.15 MHz guard band is below the usable 2.7 MHz, and a 0.15 MHz guard band is above the usable 2.7 MHz. The ratio of usable bandwidth to the entire bandwidth therefore is a load of 0.9. For 6 RBs=72 usable subcarriers in LTE, the usable bandwidth of 1.08 MHz compared to the entire bandwidth of 1.4 MHz results in a load of only 0.77; it is observed that in this case, a total bandwidth of 0.32 MHz is required as guard band against out-of-band emissions, for the smallest bandwidth the guard band size is relatively larger than for the larger cell bandwidths. Thus, although the 1.4 MHz bandwidth enables better power saving from an absolute saving perspective, the 3 MHz bandwidth may be more efficient from the aspect of power saving in conjunction with efficient usage of the entire bandwidth. Bandwidths of 5, 10, 15, and 20 MHz (with 25, 50, 75, 100 RB, respectively) also results in load of 0.9. The present invention may thus also employ 5 or 10 MHz (respectively 25 or 50 RB) as the power saving band. However, irrespectively of the possible load, the present invention is applicable to any bandwidth values (multiples of RBs).

The term "switching" employed with respect to terminal operation here refers to any changing the operation bandwidth, the bandwidth which the terminal has to support during its operation. The operation refers to monitoring a channel, receiving or transmitting on a channel.

In accordance with another aspect of the present invention, a computer program product comprising a computer-readable medium having a computer-readable program code embodied thereon is provided, the program code being adapted to carry out the present invention.

The above and other objects and features of the present invention will become more apparent from the following description and preferred embodiments given in conjunction with the accompanying drawings in which.

DETAILED DESCRIPTION

Figure 1:
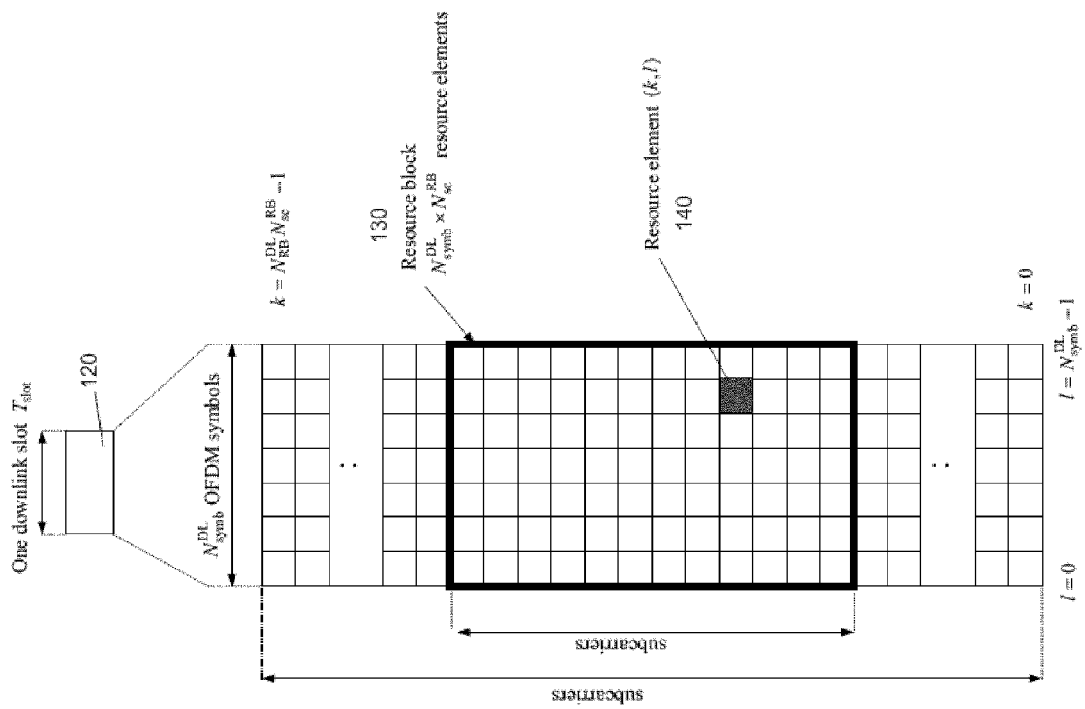
FIG. 1 is a schematic drawing showing the general structure of a sub-frame on a downlink component carrier defined for 3GPP LTE.
Figure 2:
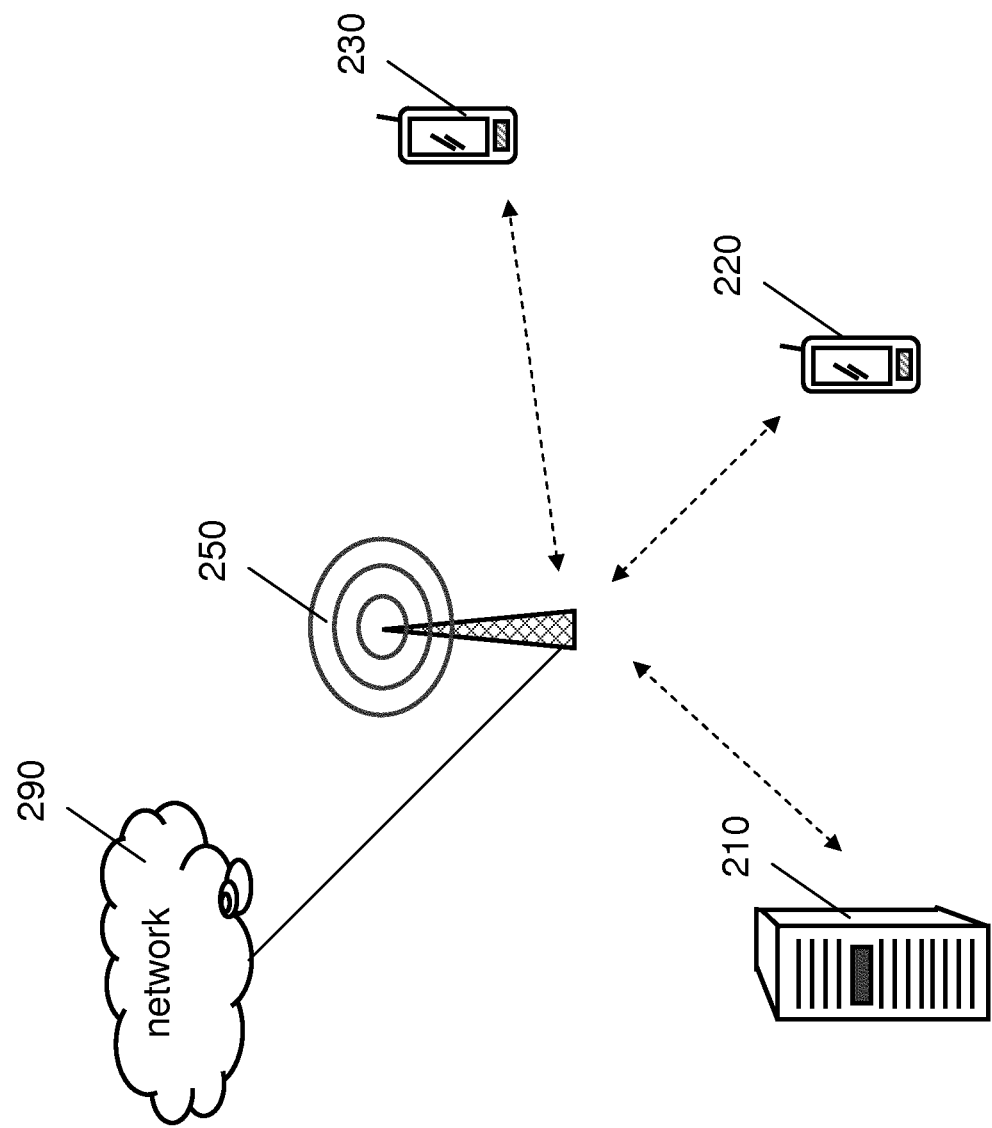
FIG. 2 is a schematic drawing illustrating a simplified example of a system to which the present invention is applicable.

The invention is related to increasing the power-consumption efficiency of communication terminals. In particular, the present invention is well-suited for mobile communication devices such as mobile phones and/or so-called machine-type communication devices that are not physically (manually) operated by an end-user, but rather used, for instance, to monitor sensor data. The machine-type communication devices typically only occasionally transmit or receive their data. For such devices, a long battery life is particularly relevant, because they are widely operated in remote locations or in locations where regular maintenance by human personnel is not economically or otherwise feasible.

The following paragraphs will describe various embodiments of the present invention. For exemplary purposes only, most of the embodiments are outlined in relation to an OFDM downlink radio access scheme according to 3GPP LTE (Release 8) and LTE-A (Release 10 or 11) mobile communication systems discussed in the Technical Background section above. It should be noted that the invention may be advantageously used for example in connection with a mobile communication system such as 3GPP LTE (Release 8) and LTE-A (Release 10 or 11) communication systems previously described, but the invention is not limited to its use in this particular exemplary communication network. The present invention may beneficially be applied to decrease the power-consumption also to terminals in any other systems employing a multicarrier modulation such as OFDM. The explanations given in the Technical Background section above are intended to better understand the mostly 3GPP LTE (Release 8) and LTE-A (Release 10 or 11) specific exemplary embodiments described herein and should not be understood as limiting the invention to the described specific implementations of processes and functions in the mobile communication network.

In order to provide a more efficient power-saving, it is desirable to enable energy saving at the UE side beyond the facilities provided by LTE Release 10, for instance, by means of DRX. The DRX mechanism offers a time-domain based power saving by allowing the UE to shut down at least a portion of its circuitry when it is not in the "active-time" (cf. Background section above). However, during the active-time, the UE needs to process the radio-frequency (RF) band and the base band according to the cell information provided by the MIB and SIBs. The cell information is, for instance, the DL or UL bandwidth. The UE needs to set its DL and UL bandwidth to the advertised (in MIB or SIB) values which are valid for the entire cell, not UE specific.

For the low-cost devices, especially in the field of MTC, the expected required data rates are quite low. It is therefore neither required nor economically feasible to operate for instance a circuitry and algorithms supporting all functions as normal UEs do. For instance, it may be reasonable not to expect the low-cost terminals to be always capable of processing up to 20 MHz (corresponding to 100-110 PRBs) in case the scheduler assigns such resource allocation. The sampling frequency at which certain receiver parts (mainly baseband-related) are operating is in general proportional to the operating (or active) bandwidth. Accordingly, a terminal operating with a bandwidth of only 1.4 MHz, which is equivalent to 72 subcarriers and using of an FFT size of 128 samples, needs to operate only at $\frac{1}{16}$th of the sampling frequency required to operate with a bandwidth of 20 MHz, which is equivalent to 1200 subcarriers and using an FFT size of 2048 samples. In case that the downlink system bandwidth is advertised as 20 MHz band, the UE has to operate at a very high sampling frequency. This is also true when the actually assigned data can be assumed to require not more than the equivalent of the 1.4 MHz bandwidth. Based in these considerations, a battery savings can be obtained when the UE is allowed to operate only with the bandwidth of 1.4 MHz, even when the advertised DL system bandwidth is larger (20 MHz).

However, operating all the time, from the power-on to the power-off, at a smaller bandwidth is connected with the following problems:

The base station (eNodeB) scheduling and the link adaptation has to manage coexistence of UEs with different active bandwidth, such as low-cost UEs supporting only the bandwidth of 1.4 MHz and "normal" (standard) UEs supporting bandwidth of 20 MHz or higher.

The frequency scheduling flexibility for bandwidth-limited PDSCH/PUSCH is extremely limited since only central 1.4 MHz are available. Accordingly, also the frequency diversity achievable is lower. It is less likely to find good channel conditions within a small bandwidth than in a large bandwidth at the same time, and it is likely that the best channel condition within a small bandwidth is worse than the best channel condition that could be found in a large bandwidth at the same time. Consequently, the terminal would be likely operating at a non-optimum spectral efficiency, and the cell likely cannot exploit the maximum spectral efficiency.

In case there are many low-cost terminals in the cell, the central bandwidth may more easily become congested. This may be the case for PDCCH as well as PDSCH and/or PUSCH.

Relative control signaling overhead is likely to be increased since large packets shall need to be segmented and transmitted in multiple subframes because the capacity per single data allocation will be rather small.

Up to now, cell-search procedures, including the reception of MIB and SIBs, are based on an operation in the full advertised DL system bandwidth. Establishing new procedure could likely cause problems with backward compatibility, particularly for the radio network side (the eNodeB) because it would need to be upgraded incurring cost before a terminal following only the new procedure could establish a connection to the radio network; a legacy eNodeB would not be able to communicate with such a terminal.

In order to overcome these problems and to provide a possibility of power-saving for low-cost UEs, according to the present invention for the synchronization and registration procedure, all UEs (including the low-power UEs) employ the existing procedures. Thus, all UEs operate using the DL and UL cell bandwidths as advertised by the MIB and the SIBs. However, in order to further save power, a low-cost (or also a normal) UE subsequently and/or upon a predetermined event enters a "bandwidth-saving mode", in which the active bandwidth is reduced from the cell-advertised bandwidth to a smaller bandwidth, subsequently called the "power-saving" bandwidth. The power-saving bandwidth is smaller than the cell-advertised bandwidth and thus also smaller than the bandwidth employed for monitoring the resources for receiving MIB.

An advantage of the present invention is the easy way of its integration into the existing DRX functionality: A UE that enters the "on-duration time" (cf. Background section above) performs this by monitoring only the power-saving bandwidth. In this operation mode, the UE detects downlink control information (DCI, transmitted on PDCCH or within the PDSCH area) for uplink or downlink resource assignments. The resource assignment on this DCI shall only be possible within the power-saving bandwidth.

Figure 4:
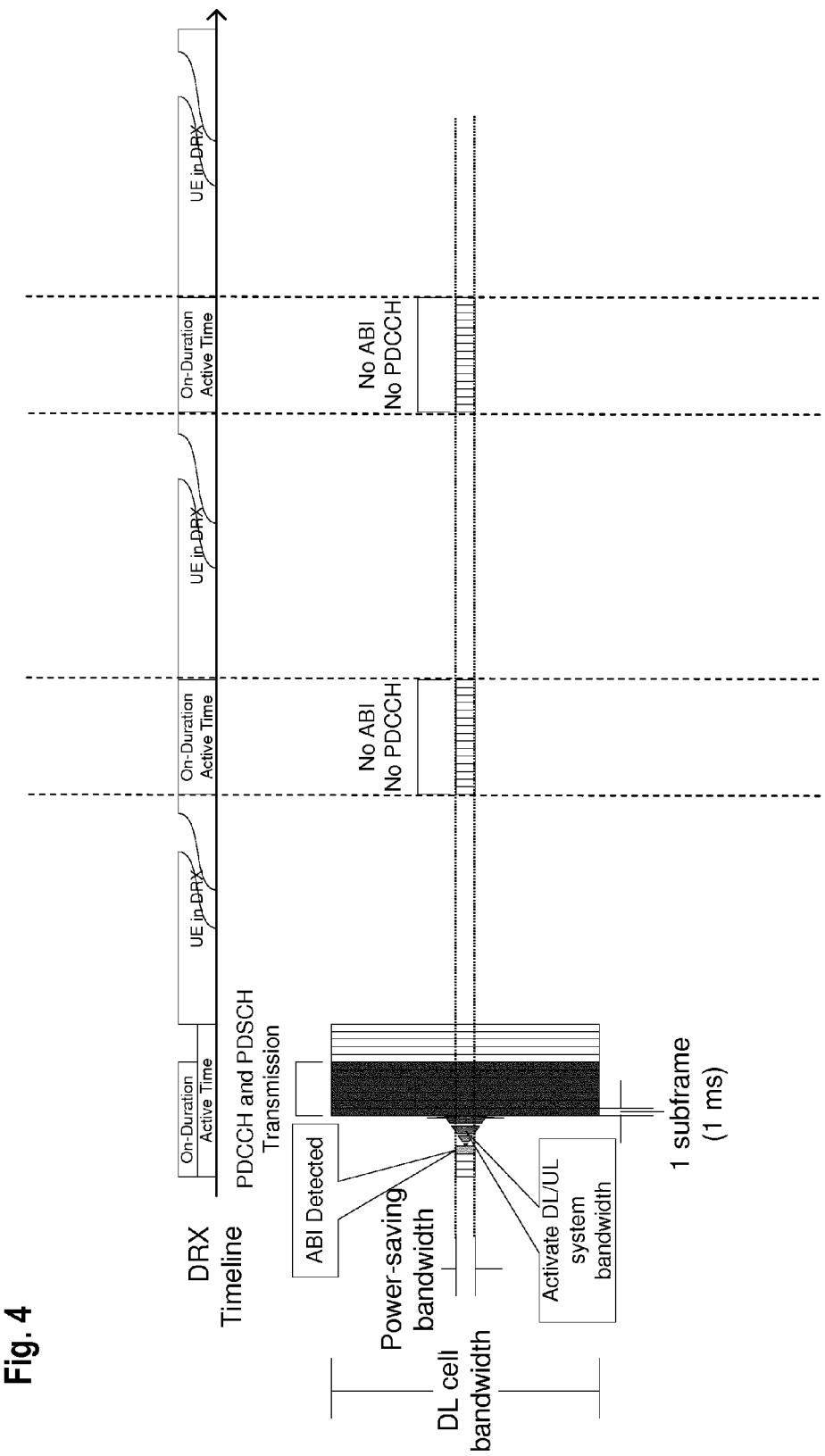
FIG. 4 is a schematic drawing illustrating an example of a terminal operation in accordance with an embodiment of the present invention.

FIG. 4 illustrates an example of such implementation of the present invention together with the DRX functionality in accordance with an embodiment of the present invention. In particular, it shows the cell bandwidth ("DL cell bandwidth") and the power-saving bandwidth narrower than the cell bandwidth, both illustrated by different vertical breadth. In the upper part of FIG. 4, the DRX timing is illustrated. In particular, in the DRX timing, the time periods of UE activity ("on duration", "active time") and UE inactivity ("UE in DRX") alternate. At the beginning, the UE is in the power-saving bandwidth operation. Here it is assumed that UE already performed the cell search, which is not illustrated in the figure. During the power-saving bandwidth operation, UE monitors PDCCH only during the UE activity time periods, otherwise it is inactive (in DRX) which enables saving the power. The power-saving operation further reduces the power consumption. While monitoring the PDCCH, in this example, the UE receives from the base station controlling the cell an active bandwidth indicator ABI ("ABI detected" in the figure). In particular, the ABI may be sent on the PDCCH. However, the present invention is not limited thereto and the ABI may also be transmitted on another protocol layer and mapped onto a physical downlink data channel such as PDSCH. There may also be a special control channel for the purpose of bandwidth control. Once the ABI is detected, it is understood by the UE as a command for switching from the power-saving bandwidth operation to the cell bandwidth operation. This is illustrated in FIG. 4 by the "activate DL/UL system bandwidth" region. After 4 ms, the UE starts operating in the cell bandwidth, which is shown in the figure by broadening of the bandwidth (vertical direction corresponds to bandwidth, horizontal direction corresponds to time). It is noted that the 4 ms are only an example and that the switching may take also more or less time; the value 4 has here been mainly chosen as the smallest time that is currently defined between the reception of a DCI carrying an uplink resource assignment and the subsequent uplink transmission. As mentioned previously (cf. Background Section) a UE that wants to employ power-saving in the uplink must be capable of switching on the uplink processing and circuitry between the uplink resource assignment and the uplink transmission within 4 ms. Therefore, a similar behavior seems to be feasible to modify the active bandwidth in downlink. During the active UE time period after receiving ABI, the UE operates in the cell bandwidth, in which it may receive PDCCH and/or PDSCH (illustrated by darker-colored subframes of the cell bandwidth—"PDCCH or PDSCH transmission"). The remaining subframes until the end of the active UE period are used to monitor the PDCCH by the UE whether there is data for it or not. Here the term monitoring refers to blind decoding performed in a predetermined search space within the cell bandwidth resources. With the start of the DRX time period, the UE is inactive, meaning that it is generally not required to monitor the PDCCH any longer; the details of the required UE behavior when the UE is not in Active Time can be found in Section 5.7 of 3*GPP TS* 36.321, *"Evolved Universal Terrestrial Radio Access (E-UTRA); Medium Access Control (MAC) protocol specification"*, freely available at www.3gpp.org. Upon terminating the DRX time period, which may be upon expiry of a DRX timer, the UE wakes up. In this exemplary embodiment, the UE wakes up in the power-saving bandwidth operation. It monitors PDCCH, however, in this example does not receive any allocation and also does not receive any ABI during the corresponding Active Time. In such case, the UE remains in the power-saving bandwidth operation the entire corresponding Active Time.

It is noted that the example described above with reference to FIG. 4 is only one of the possibilities for implementing the present invention in combination with the DRX. However, the present invention is not limited thereto. FIG. 4 illustrates cases in which no ABI was received and no PDCCH resource assignment. The behavior of the UE upon receiving ABI is to switch to the cell bandwidth. If no ABI is received, but the UE receives a resource allocation on PDCCH, the following scenarios are possible in compliance with the present invention:

The resource allocation is only for resources in the power-saving bandwidth and thus, the UE shall receive the PDSCH (a physical downlink data channel) also in the power saving bandwidth. This assumes that the base station (eNodeB, or in general, a network node controlling the base station) allocates also the physical channel data resources to the UE according to the current UE's bandwidth operation.

Alternatively, the resource allocation may be an event which causes switching of the UE to the cell bandwidth mode. In such a case, the timing of the resources allocated may be determined fixedly with respect to receiving the PDCCH allocation or with respect to receiving ABI, for instance a predetermined number of subframes after receiving the PDCCH/ABI. For similar reasons as indicated previously for component carrier activation, the preferred predetermined number of subframes is equal to 4. In an alternative embodiment, in case of a PDCCH transmitting an uplink resource assignment in the DCI, the DCI has the capability of addressing the UL cell bandwidth. If the uplink resource assignment is assigning only resources within the power-saving bandwidth, the UE continues to operate only within the power-saving bandwidth. If the uplink resource assignment is assigning resources that are at least partly outside of the power saving bandwidth, the UE is switching to the cell bandwidth in DL and/or UL within a predetermined number of subframes after receiving the PDCCH/DCI, behaving as if it had received an ABI. Again the preferred predetermined number of subframes is equal to 4. In general, any allocation received on PDCCH and extending over the power-saving bandwidth may be additionally interpreted as a command for a UE to switch back to the cell bandwidth.

As an alternative embodiment, one or more bits in a DCI format are used as ABI. For example, a new "active bandwidth indicator" bit or field can be introduced along with a resource block assignment field.

The above examples were mainly described with respect to the downlink operation, with respect to terminal receiving the control and data channel. However, the present invention is equally applicable to the uplink operation. For instance, the uplink and downlink operation may be switched together. In particular, upon a particular event or upon receiving the ABI, the UE does not only switch the downlink bandwidth to the cell bandwidth but also the uplink bandwidth. In the power-saving bandwidth mode (operation), not only downlink data is received only on a subset of the cell subcarriers but also the uplink data may be sent only on the subset of the cell subcarriers corresponding to the power-saving bandwidth.

For some applications it may also be beneficial to control separately the downlink active bandwidth and the uplink active bandwidth. For instance, the reception (downlink) may be performed within the power-saving bandwidth while as soon as there are any resources allocated for the uplink, the UE may switch to the uplink cell bandwidth. This operation may be beneficial, for instance for terminals which regularly report larger bursts of data, but do not receive a lot of data in the downlink, or where the downlink reception is mainly required in order to correctly receive the uplink resource assignments. Such terminals may be machines used for automatic monitoring of far locations or similar.

In other applications, it may be beneficial to only switch the downlink bandwidth and to always apply the power-saving bandwidth to the uplink transmissions. This operation may be useful for terminals which rarely transmit or transmit only small amounts of uplink data, such as for example data acknowledgement messages.

In general, the different operation of uplink and downlink bandwidth may be achieved, for instance by providing also separate indicators (ABI) from the base station for controlling the uplink and the downlink bandwidth operation. As is clear to those skilled in the art, the embodiments and examples described herein are applicable also separately to the uplink and downlink.

Figure 3:
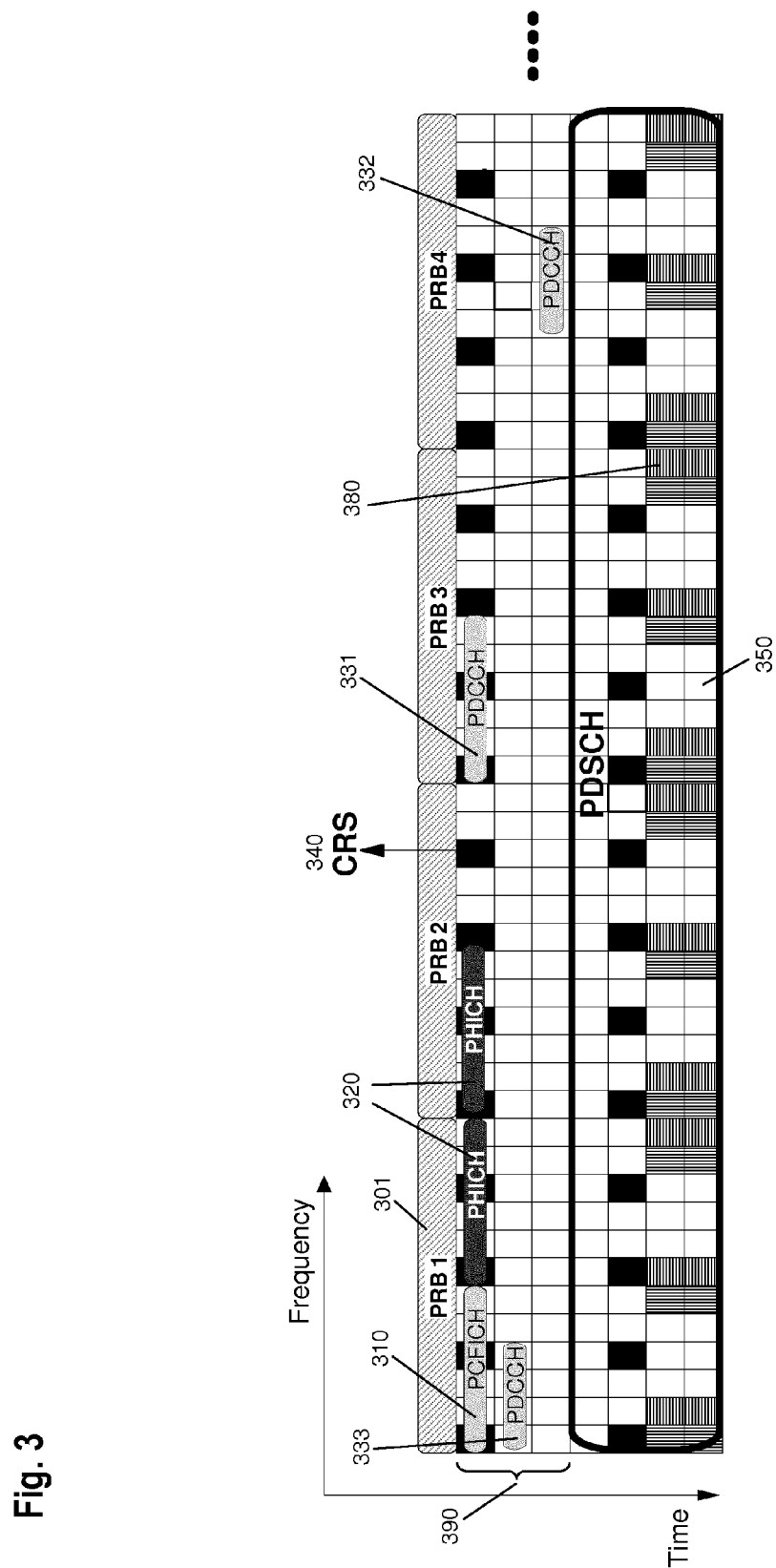
FIG. 3 is a schematic drawing illustrating an example of resource allocation in the control region.
Figure 5A:
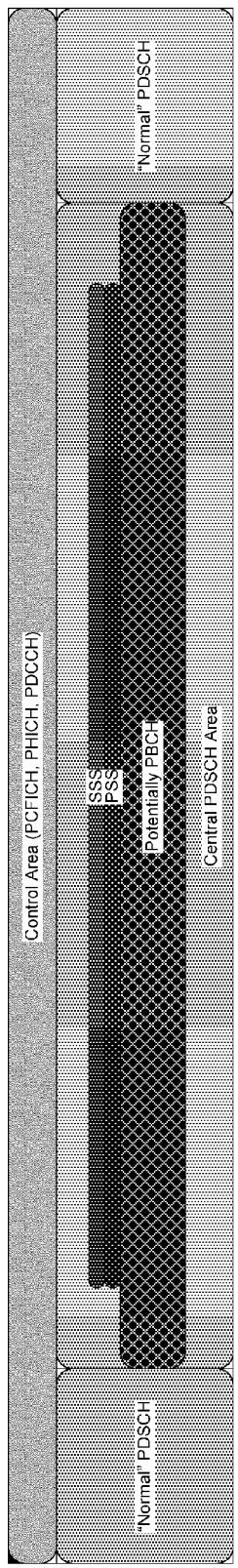
FIG. 5A is a schematic drawing illustrating an example of the time/frequency grid for FDD showing how several physical channels and signals are mapped in a subframe where PSS, SSS, and PBCH are transmitted.
Figure 5B:
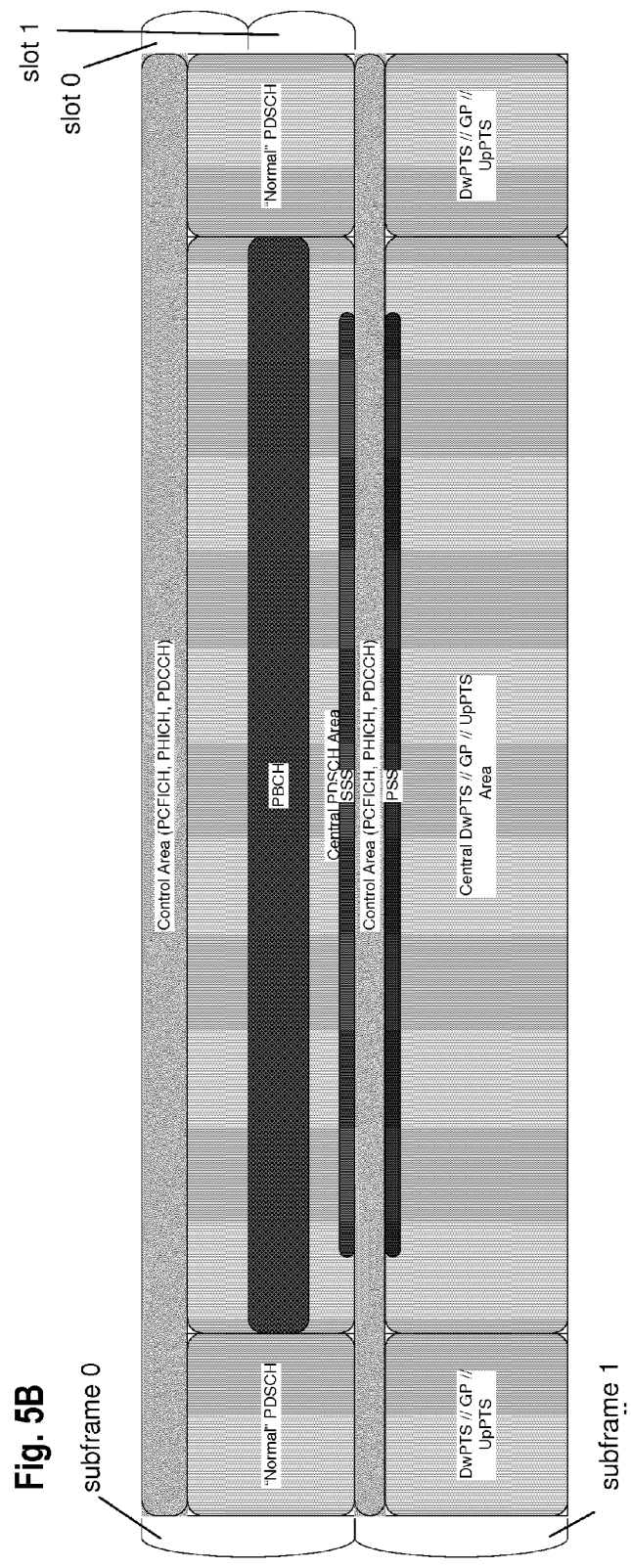
FIG. 5B is a schematic drawing illustrating an example of the time/frequency grid for TDD showing how several physical channels and signals are mapped in two subframes where PSS, SSS, and PBCH are transmitted.

FIGS. 5A and 5B illustrate for FDD and TDD, respectively, control area (first three rows) and data area of an example resource grid applicable for the present invention. In particular, the control area may be similar to the control area described with reference to FIG. 3 and may thus include any of the PCFICH, PHICH and PDCCH. The data area is separated into its central part ("Central PDSCH area") and the side parts ("normal PDSCH") to the right and to the left of the central area. The central area corresponds to the power-save bandwidth including the first number of subcarriers (or physical resource blocks), preferably 72. However, the number of subcarrier 72 here is only an example taken with respect to the present operation of the LTE system. For other systems, configurations of LTE or its releases, the number of subcarriers may be higher or lower than that. The central area may carry the PSS and the SSS as well as PBCH. It comprises physical downlink resources on which the UEs operating in the power-saving bandwidth are scheduled. The side areas ("normal PDSCH") illustrate the remaining cell bandwidth which is not used by the UEs when operating in the power-saving bandwidth. On the other hand, the side areas may be used for UEs operating in the cell bandwidth. In particular the side bands and the central band mark the bands on which the UE may become resources scheduled (downlink and/or uplink resources).

Preferably, the length of the downlink signaling information (such as DCI in LTE) for the power-saving bandwidth is smaller than for the cell bandwidth in order to reduce the control overhead and to increase the coverage and error resilience of the DCI. The downlink control information indicates allocation assignments for the UE on downlink and/or on uplink resources.

For example looking at the various defined DCI formats as specified in 3GPP TS 36.212, the following sizes are obtained (including CRC) for different active bandwidths (assuming the same active bandwidth in uplink and downlink):

| Size of the DCI format in bits | 1.4 MHz | 3 MHz | 5 MHz | 10 MHz | 20 MHz |
|---|---|---|---|---|---|
| DCI Format 0 | 37 | 38 | 41 | 43 | 44 |
| DCI Format 1 | 35 | 39 | 43 | 47 | 55 |
| DCI Format 1A | 37 | 38 | 41 | 43 | 44 |
| DCI Format 1B | 38 | 41 | 43 | 44 | 46 |
| DCI Format 1C | 24 | 26 | 29 | 29 | 31 |
| DCI Format 1D | 38 | 41 | 43 | 44 | 46 |
| DCI Format 2 | 47 | 50 | 55 | 59 | 67 |

| Size of the DCI format in bits | 1.4 MHz | 3 MHz | 5 MHz | 10 MHz | 20 MHz |
|---|---|---|---|---|---|
| DCI Format 2A | 44 | 47 | 52 | 57 | 64 |
| DCI Format 2B | 44 | 47 | 52 | 57 | 64 |
| DCI Format 2C | 46 | 49 | 54 | 58 | 66 |
| DCI Format 4 | 46 | 47 | 50 | 52 | 54 |

It follows that in case that the active bandwidth is only 1.4 MHz in a cell bandwidth of 20 MHz, DCI format 0 can save 7 bits, which is equivalent to a coding gain of roughly $44/37 \approx 0.75$ dB, the error resilience of the power-saving DCI can be the same as the cell-bandwidth DCI even though it is transmitted with 0.75 dB less power; or if they are assumed to be transmitted with identical power, the error probability for the power-saving DCI can be expected to be the same as if the cell-bandwidth DCI had been transmitted with 0.75 dB more power. Here, "power-saving DCI" refers to the downlink control information which indicates downlink control information in the power-saving bandwidth operation and targeted at terminals that operate on the power-saving bandwidth. Advantageously, its size is smaller than the size of the DCI for operation in a larger bandwidth.

In the case that only small data packets need to be received or transmitted by such a low-cost UE, the power-saving bandwidth (cf. the central bandwidth in FIG. 5A, 5B) will be sufficient. However, when there is a danger of congestion, according to an embodiment of the present invention, the base station is configured to request a terminal to switch from the bandwidth power-saving mode to the cell-bandwidth mode. This may be achieved, for instance, by providing an indicator signaled from the base station to the terminal for requesting the UE to resume the cell-bandwidth operation as already shortly described above with reference to FIG. 4. In particular, the eNodeB may have the functionality to transmit an "Active Bandwidth Indicator" (ABI) to the UE. This ABI instructs (commands) the UE to switch from the power-saving bandwidth operation to the cell bandwidth operation. Upon receiving (decoding) of the indicator (ABI), the UE switches to the normal operation. The switching process may be assumed to be performed by the UE within a few subframes. Accordingly, the base station which has an overview of the cell resources, may efficiently avoid any congestions of the central subcarriers.

Upon entering the cell-bandwidth operation mode, the low-cost UE behaves like any other UE operating on the cell bandwidth, such as any UE working according to the Release 8-10 of LTE. This provides an advantage of backward compatibility with respect to Release 8-10 cells, as the network side is not required to upgrade in order to communicate with the terminal, and in fact only needs to upgrade the relatively easy aspect of introducing ABI mechanisms if it wants to enable the power-saving mechanism at the terminal side.

In general, the information contained in MIB and SIB2 could also allow the change of the cell bandwidth of the DL and UL, respectively. However, providing an indicator signaled from the base station to a UE may provide the following benefits:

ABI may provide faster change of the UE behavior, which cannot be achieved by system bandwidth reconfiguration. System bandwidth change can only be advertised by change in MIB/SIB, which cannot change frequently. ABI may be transmitted basically in any (every) subframe. This enables fast control of the cell resources of the central bandwidth and their allocation to low-cost and normal UEs.

ABI-based cell-bandwidth activation is UE-specific. System bandwidth is cell-specific. A change of the system bandwidth thus affects all UEs in the cell (regardless of traffic status). With ABI, the eNodeB may handle different UEs in a different manner, efficiently manage the congestion avoiding situation by only forcing some UEs into the call-bandwidth operation while enabling other UEs in the cell remaining in the power-saving bandwidth operation. Furthermore, it is possible to have only a first set of UEs with the cell bandwidth as the active bandwidth during a first period and a second set of UEs with the power-saving bandwidth as the active bandwidth during the same first period, while during a second period, respective third and fourth sets of UEs with the cell bandwidth and the power-saving bandwidth, respectively, as the active bandwidth. In that way, not only the UE behaviour can change quite dynamically but also the number and identity of UEs that the eNodeB wishes (or is able to) manage in the power-saving bandwidth can be changed quite dynamically.

In the following, a procedure of entering the power-saving bandwidth operation according to an embodiment of the present invention will be described in more detail.

The UE starts the power-saving bandwidth operation in one or more of the following condition(s):

After the connection establishment procedure is finished. The connection establishment procedure is controlled in LTE by RRC protocol. Preferably, the UE enters the power-saving bandwidth operation after transmitting the RRCConnectionSetupComplete or RRCConnectionReconfigurationComplete messages.

Alternatively or in addition, the UE enters the power-saving bandwidth operation after an explicit command received from the base station. For instance, the eNodeB, may transmit such a command by using RRC protocol or MAC control element (CE). Various MAC CEs in LTE are described in detail in 3GPP TS 36.321 Section 6.1.3. Preferably, a MAC CE to send a UE into power-saving mode is similar to the currently specified DRX Command MAC Control Element (Section 6.1.3.3), where one of the "reserved" entries in Table 6.2.1-1 is identified as Power Saving Bandwidth Command. Another possibility is to adapt the Power Headroom MAC Control Element, where the values indicate the active bandwidth that should be used by the UE after receiving this MAC CE. Assuming that only active bandwidths of 6, 15, 25, 50, 75, 100 RBs need to be represented, this could look like the following (in addition to using one of the "reserved entries in Table 6.2.1-1 as mentioned above). Note also that this assumes active bandwidth in DL being equal to the active bandwidth in UL. Alternatively, the values could only indicate the DL active bandwidth (as only that is important in order to receive resource assignments). Alternatively, one such definition is needed for each DL Active Bandwidth MAC CE and UL Active Bandwidth MAC CE, or they are combined into a single MAC CE that offers the full flexibility of combinations between UL and DL active bandwidths.

Alternatively or in addition, the UE enters the power-saving bandwidth operation after waking up from DRX, when entering the active-time and/or the on-duration time (cf. the description above with reference to FIG. 4).

When the usage of DRX is configured, when the UE receives in the LTE context an DRX_Config setup (not a release) information as outlined in 3*GPP TS* 36.331, "*Evolved Universal Terrestrial Radio Access*

(*E-UTRA*); *Radio Resource Control Protocol*" Section 6.3.2, available freely on www.3gpp.org in the subsection MAC-MainConfig.

Alternatively or in addition, the UE enters the power-saving bandwidth operation after a certain configurable time period during which no PDCCH has been detected, if for a longer time the UE does not receive any resource assignments. This time period may be configured, for instance by RRC. This time period may depend on the timing of DRX (cf. below), but may be also independent therefrom. Accordingly, also UEs without DRX configured may reduce the power consumption by reducing their active uplink and/or downlink bandwidth.

Alternatively or in addition, the UE enters the power-saving bandwidth operation when (as soon as) the DRX inactivity timer expires. It is similar to the previously described option, however here the DRX inactivity timer is reused also for the purpose of bandwidth switching and no separate timer is required.

For the above described example of conveying the commands in MAC control elements, in the following details of a possible signalling structure compatible with LTE are provided. It is noted that these details are for exemplary purposes and not to limit the scope of the invention. As is clear to those skilled in the art, the signalling of commands may also be performed in a different way.

Figure 8:
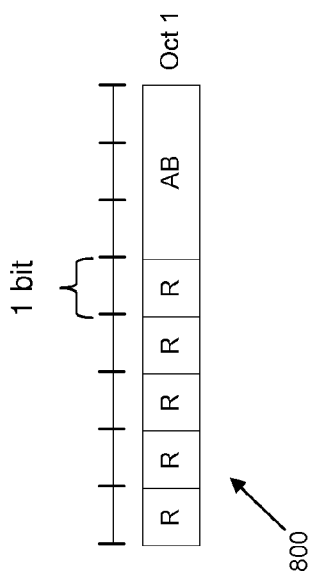
FIG. 8 is a schematic drawing illustrating an example of an information element which may carry an active bandwidth indicator according to an embodiment of the present invention.

The Active Bandwidth MAC control element may be identified by a MAC (Protocol Data Unit) PDU subheader with Logical Channel ID (LCID) as specified in Table 6.2.1-1 of 3GPP TS 36.321 v10.3.0. It has a fixed size and consists of a single octet defined by 5 R-fields and an AB field as illustrated in FIG. 8. In the active bandwidth MAC control element 800 shown in FIG. 8, a field "R" stands for reserved bit, which is to be set to "0". The field "AB" stands for "Active Bandwidth" and controls the active bandwidth in RBs. The length of the field is 3 bits. The AB value and the corresponding active bandwidth values are shown in the following Table.

| AB | Active Bandwidth Value |
|---|---|
| 0 | 6 RB |
| 1 | 15 RB |
| 2 | 25 RB |
| 3 | 50 RB |
| 4 | 75 RB |
| 5 | 100 RB |
| 6-7 | reserved |

The above example related to a case in which a common UL and DL active bandwidth is configured. In the following, another example is provided which enables configuring downlink and uplink bandwidth for the UE individually. The Active Bandwidth MAC control element may be identified by a MAC PDU subheader with LCID as specified in Table 6.2.1-1 of 3GPP TS 36.321 v10.3.0. It has a fixed size and consists of a single octet defined by two "R" fields, an DLAB field and an ULAB field. The "R" field correspond to a reserved bit, set to "0". The field Downlink Active Bandwidth (DLAB) controls the downlink active bandwidth in RBs. The length of the field is 3 bits. The DLAB value and the corresponding downlink active bandwidth values are shown in table below.

| DLAB | Downlink Active Bandwidth Value |
|---|---|
| 0 | 6 RB |
| 1 | 15 RB |
| 2 | 25 RB |
| 3 | 50 RB |
| 4 | 75 RB |
| 5 | 100 RB |
| 6-7 | reserved |

The field Uplink Active Bandwidth (ULAB) controls the uplink active bandwidth in RBs. The length of the field is 3 bits. The ULAB value and the corresponding uplink active bandwidth values are shown in table.

| ULAB | Uplink Active Bandwidth Value |
|---|---|
| 0 | 6 RB |
| 1 | 15 RB |
| 2 | 25 RB |
| 3 | 50 RB |
| 4 | 75 RB |
| 5 | 100 RB |
| 6-7 | reserved |

Figure 9:
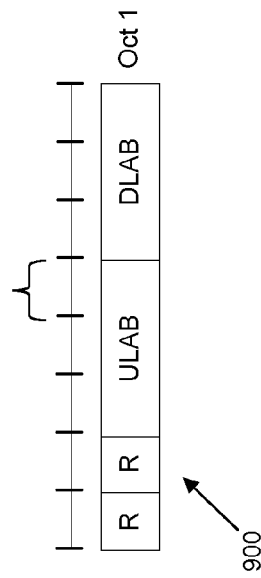
FIG. 9 is a schematic drawing illustrating an example of an information element which may carry a downlink and an uplink active bandwidth indicator according to an embodiment of the present invention.

A corresponding Active Bandwidth MAC control element 900 is illustrated in FIG. 9. As can be seen, in both examples (common UL+DL bandwidth control, separate UL, DL bandwidth control), the length of the indicator is same, namely 1 octet. It is noted that the above MAC CEs are examples and that the present invention may be implemented by using sizes of the AB, ULAB, DLAB fields different (smaller or bigger) than 3 bits and assign the values to these fields in a different way.

When the UE is in the power-saving bandwidth operation, it may re-enter the cell-bandwidth operation upon detection of ABI as described above. Preferably, the UE activates the cell bandwidth operation within 4 ms.

Advantageously, the ABI is a downlink control information similar to the defined DCI formats that are existing already for resource assignments. A short payload is preferred because it requires only few resources to be transmitted, which is particularly beneficial since the ABI has to be transmitted within the power-saving bandwidth, where resources are less abundant than within the cell bandwidth.

The generally shortest existing DCI format offered by LTE up to Release 10 that can be used easily for ABI is the DCI format 10, which according to the 3GPP TS 36.212 comprises the following elements if it is used for very compact scheduling of a single PDSCH codeword:

For $N_{RB}^{DL} \geq 50$, with the length of 1 bit indicates the gap value,

Resource block assignment, with the length of $\lceil \log_2(\lfloor N_{VRB,gap1}^{DL}/N_{RB}^{step}\rfloor \cdot (\lfloor N_{VRB,gap1}^{DL}/N_{RB}^{step}\rfloor + 1)/2)\rceil$ bits, and Modulation and coding scheme, with the length of 5 bits.

The minimum size of the DCI format 10 for a downlink cell bandwidth of 6 RBs is therefore 8 bits, plus a 16-bit CRC masked by the UE-specific RNTI.

For the purpose of the CRC masking and in order to distinguish a DCI format 10 used for ABI from the DCI format 1C used for very compact scheduling of a single PDSCH codeword, a new ABI-RNTI may be used. In such case, all the DCI elements identified (except the CRC) can be used as virtual CRC against false positive detection of ABI, or to convey additional information. In other words, the bit values of the DCI elements can be set to a predefined value (0). Then the terminal can check after FEC decoding of the DCI if the decoded CRC is matching with the expected CRC resulting from the decoded DCI elements (taking the ABI-RNTI masking into account). If this check passes, a further check is to verify that actually the decoded DCI elements are all detected as having the predefined value. If this check does not pass, then it is clear that there have been some transmission errors that had been undetected by the conventional CRC. Therefore, the DCI elements with the predefined value serve as a checksum extension, which is sometimes called a virtual CRC. The ABI-RNTI is preferably assigned and indicated to a UE in the same way as an SPS C-RNTI (see 3GPP TS 36.331, description of the information element SPS-Config), by transmitting an RRC message that contains the ABI-RNTI to a UE. The transmission of the RRC message further follows the procedures outlined in 3GPP TS 36.331. It is noted that a separated ABI-RNTI may be used for uplink and downlink ABI, when signalled separately.

Alternatively, the C-RNTI of UEs operating in the power-saving bandwidth may be used. In order to use this for ABI, an unambiguous identification is required that differentiates the ABI from a regular format 1C resource assignment for PDSCH for the target UE. It can be shown (similarly to 3GPP contribution *R1-090197, "DCI formats and bit fields for SPS deactivation"* January 2008, RAN1 meeting no. 55bis, freely available at www.3gpp.org) that the resource block assignment is meaningless if all the bits of that field are set to "1", regardless of the number of RBs or the gap or step values. Therefore, the ABI is preferably indicated by a DCI format 10 that has all bits of the resource block assignment field set to "1"s. As we assume that the power-saving bandwidth is usually smaller than 50 RBs, the gap value bit is usually not present.

From the definition, it is evident that the 5 bits from the modulation and coding scheme field can be used for different purposes, as no resource assignment actually takes place. One aspect is to transmit a predefined value, such as "11111", which serves as a virtual checksum in order to verify that the ABI is received correctly. In an alternative of the present invention, some or all of those bits preferably indicate one or more additional information as described below.

According to an advantageous embodiment of the present invention, a single ABI may be used to address a group of power-saving UEs at a time. In particular, in case of simultaneous ABI transmission to a group of MTC UEs (or low-cost UEs), DCI format 3/3A with a new ABI-RNTI is preferred. Within such a DCI format, 1 (for format 3A) or 2 (for format 3) bits per UE may indicate(s) whether the UE should keep operation in the power saving bandwidth or switch to the cell bandwidth. Moreover, in case of 2 bits available, additional information may further be included. In particular, each low-cost UE in the group would use the ABI-RNTI to decode the DCI. The assignment of a UE to a group RNTI can preferably be established along the lines as described in the context of the information elements TPC-PDCCH-Config, where an RNTI as well as an index for the addressed UE can be established. It should be noted that the group-based activation can alternatively activate the bandwidth of the whole group at once (in which case no index is required), however this is equivalent to assigning the same ABI-RNTI to a plurality of UEs. In general, for the present invention is immaterial, in which way the assignment of a UE to a group is performed and any of the well-known approaches, for instance, those employed in LTE, may be used.

Accordingly, up to 21 UEs can be covered by one ABI-RNTI if the power-saving bandwidth is 6 PRB (72 subcarriers). A benefit of the group ABI-RNTI is that multiple UEs can switch at the same time, for instance, for the purpose of multicast reception during which devices in a group may receive the same data in the cell. This requires a very little control overhead in comparison to handling the UEs separately.

It is further envisaged that a UE may monitor the ABI within the power-saving bandwidth even if it is operating in the cell bandwidth, in order to know whether it should switch back if the corresponding bit indicates an operation in the power-saving bandwidth.

Apart from the indicator (ABI) for activating the operation of the larger bandwidth, one or more of the following information could be conveyed by the DCI, depending on its format, availability of bits for signaling in particular DCIs:

- An active-bandwidth (cell bandwidth) timer value for indicating how long to keep the larger bandwidth (the cell bandwidth) activated: The timer may indicate, for instance, how many subframes after the activation of the cell bandwidth, the UE shall operate in the cell bandwidth before switching back to the power-saving bandwidth. After the active-bandwidth timer expires, the UE may automatically transit to the power-saving bandwidth operation.
- A target active bandwidth size and/or location: For example, the active (cell) bandwidth could be another bandwidth than the cell bandwidth. In particular, the cell bandwidth may have a value between the power-saving bandwidth and the cell bandwidth (including the latter). In addition or alternatively, location of the active bandwidth may be signaled. If it is smaller than the cell bandwidth (50 RB in a 100 RB cell), an additional indication is possible where the active bandwidth region resides with respect to the cell bandwidth (upper, middle, lower 50 RB in a 100 RB cell, or any other location).
- A resource where an ABI acknowledge message is to be transmitted (cf. details described below).

It may be advantageous to transmit the ABI only in the PSS and/or SSS subframes or PSS and/or SSS and/or PBCH subframes. PSS subframes are subframes carrying PSS. Similarly, SSS subframes are subframes carrying SSS and PBCH subframes are subframes carrying PBCH. In LTE, the PSS and SSS are transmitted each 5 ms and PBCH each 10 ms. Generally, the synchronizations reference signals and the system broadcast channel are not transmitted in each subframe and therefore, providing ABI in PSS/SSS/PBCH may result in less flexibility and slightly slower switching. For instance, the ABI is only transmitted in subframes carrying the PSS or SSS or PBCH subframes and only in the central 6 PRBs. These resources are not attractive for downlink data channel (shared channel, PDSCH in FIGS. 5A and 5B) since a substantial amount of the resource elements are already used by PSS/SSS/PBCH and possibly for E-PDCCH (cf. FIGS. 5A and 5B). The table below exemplifies the usage of resources for E-PDCCH in case of a normal subframe (subframe without SSS, PSS and PBCH), a subframe including both PSS and SSS, and a subframe including PSS, SSS, and PBCH on the situation depicted exemplarily in FIGS. 5A and 5B. E-PDCCH is an enhanced physical downlink control channel which should be supported by Release-11 UEs and which shall enable localized frequency allocation, beamforming and other features improving the coding efficiency. It is allocated by means of control channel elements (CCE) similarly to the PDCCH. A CCE includes a predefined number of resource elements, which for LTE up to Release 10 and the PDCCH use case is defined as 9 resource element groups (REG) each consisting of 4 resource elements, so that a PDCCH CCE is composed out of 36 resource elements. In the case of E-PDCCH, the number of resource elements in a control channel element may be a function of different factors, the value indicated by the CFI, the number of antenna ports. Still, those factors will be known by the UE and can be correctly applied prior to the E-PDCCH detection, so that the number of resource elements in an E-PDCCH control channel element is well-defined, even if it is varying from subframe to subframe (or even from resource block to resource block).

| Assuming just a single E-PDCCH in 1.4 MHz | 4 CCE case (144 REs for E-PDCCH) | 8 CCE case (288 REs for E-PDCCH) |
|---|---|---|
| Normal subframe | 552 REs for PDSCH (79% capacity) | 408 REs for PDSCH (59% capacity) |
| PSS + SSS subframe | 428 REs for PDSCH (61% capacity) | 284 REs for PDSCH (50% capacity) |
| PSS + SSS + PBCH subframe | 188 REs for PDSCH (27% capacity) | 44 REs for PDSCH (11% capacity) |

Since these resources are not attractive for downlink data transmission, they may beneficially be utilized for the ABI transmission with barely any effect on the cell throughput.

For instance, the total number of resource elements available for PDSCH in 1.4 MHz (normal cyclic prefix (CP), CFI=3, no DM-RS or CSI-RS present, 4 CRS ports) in a normal subframe is 116×6=696 REs corresponding to 6 PRBs. The subframe including PSS, SSS, and PBCH includes 116×6−2×62 (PSS and SSS)−2×72 (PBCH)−2×48 (PBCH where some REs are required for reference signals)=332 REs at most available for PDSCH, resulting already in only 48% of the normal subframe PDSCH capacity. Similarly, in a subframe, which includes PSS and SSS, but not PBCH, the number of REs is 116×6−2×62 (PSS and SSS)=572 REs, corresponding to 82% of a normal subframe. If power-saving UEs need to receive E-PDCCH in the central 1.4 MHz (largest power saving possible), the PSS/SSS and PSS/SSS/PBCH subframes are very even less attractive to address the power-saving-UEs because additional PDSCH resources are required for the E-PDCCH transmission, as shown in the above table where additional 144 or 288 REs are consumed for the E-PDCCH. Since 1.4 MHz cannot offer sufficient frequency diversity, E-PDCCH targeting a power-saving UE can be assumed to regularly require the equivalent of 4 or 8 CCEs. The result is that those subframes and resource blocks are even less attractive for PDSCH resource allocations, because they offer in some cases only 27% or 11% of the nominal PDSCH capacity of a resource block. Therefore, it is more efficient to use these for ABI transmission which then makes the use of a wider bandwidth possible, where no REs are lost for (E-)PDCCH transmission because the existing PDCCH mechanism can be used to assign the PDSCH resources.

The power-saving bandwidth as well as the active (cell) bandwidth can be configured in a cell-specific or in a UE-specific manner, preferably by the RRC, and, in general by a higher layer protocol. It should be noted that the described methods with respect to the cell bandwidth can be applied to an active bandwidth smaller than the cell bandwidth, mutatis mutandis.

Alternatively, the bandwidth configuration may be combined with the DRX configuration. For example, the DRX configuration message may contain a new information element (IE) for indicating whether the power-saving bandwidth is supposed to be 6, 15, 25, 50, 75, or 100 RBs. At most 3 bits would be required for this choice of bandwidths. However, the present invention is not limited by this example. In general, in order to improve the power saving operation, a single bit may be provided to configure (distinguish configuration) between a power-saving bandwidth of 6 or 15 RBs (or alternatively, between 15 and 25 RBs, or generally between two values each smaller or equal to 25 PRB).

In order to reduce the error case of missing (the eNodeB transmits, but the terminal does not detect it due to transmission errors) ABI, the UE may send physical layer acknowledgement (ACK) message in the uplink, in FDD preferably four subframes after the ABI detection or in TDD whenever an acknowledgement would be impending if a PDSCH had been transmitted instead of the ABI, using the PUCCH procedure usually used for PDSCH transmissions. With such an acknowledgement, the eNodeB can detect whether the terminal has correctly received the ABI. The lack of acknowledgement or an explicit negative acknowledgement (NACK) by the terminal could cause the eNodeB to transmit another ABI with more power or using a lower coding rate, or at least to use only the power-saving bandwidth for that terminal while the ABI has not been positively acknowledged by the terminal.

Assuming that UL can become active in 4 ms (after the ABI transmission by the base station), ACK can be transmitted in the PUCCH resources of the UL cell bandwidth. This solution integrates without problems into the UL bandwidth usage by other UEs. The PUCCH resource is preferably determined as a function of the resource(s) where the ABI is transmitted. For instance, the PUCCH resource is located in a subframe located a predetermined number of subframes after the subframe in which the ABI was signaled. Alternatively, the PUCCH resource may located in a preconfigured PUCCH resource position such as a position defined by RRC, similarly to the relay uplink backhaul ACK/NACK case as shown in 3*GPP TS* 36.216 *v*10.3.1, *"Evolved Universal Terrestrial Radio Access (E-UTRA); Physical layer for relaying operation"*, Section 7.5, June 2011, available freely on www.3gpp.org, or on a resource that is indicated as a part of the ABI itself, similar to the case of acknowledgement of an SPS activation as shown in 3GPP TS 36.213 v10.3.0 section 9.2, where a two-bit field determines one out of four preconfigured PUCCH resources that shall be used for ACK/NACK transmissions.

Figure 6:
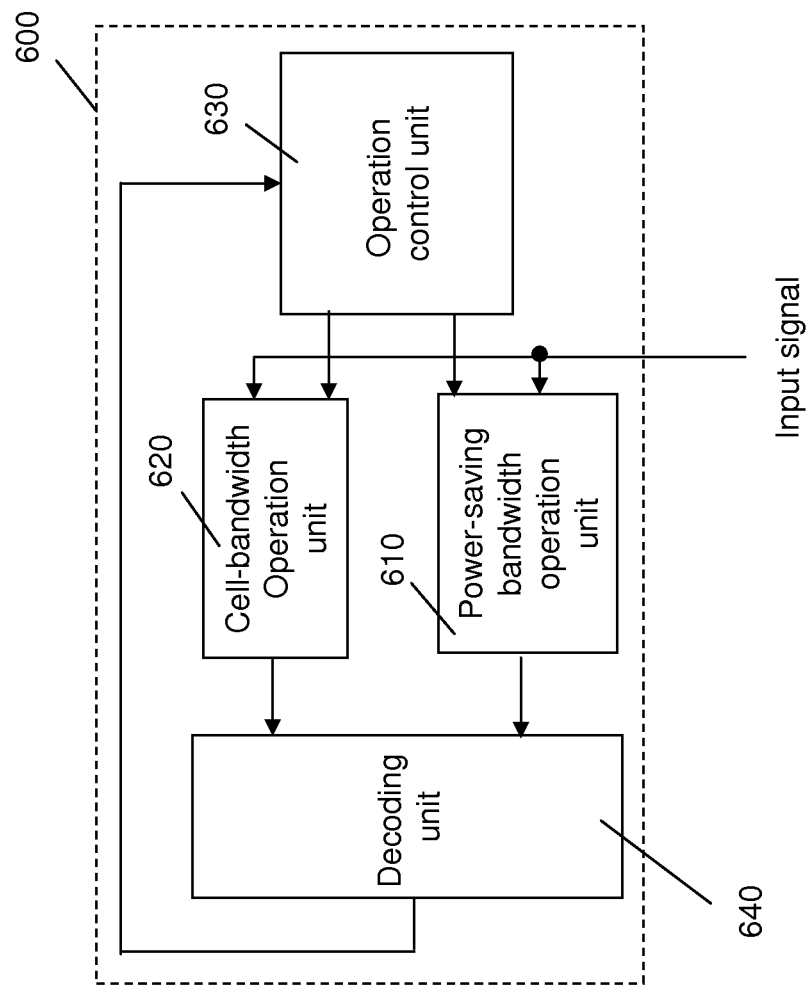
FIG. 6 is a block diagram illustrating an example of a transmitter and receiver according to an embodiment of the present invention.

FIG. 6 illustrates an example block diagram showing functional blocks of a terminal 600 according to an embodiment of the present invention. A terminal of this embodiment is for receiving signals in a cellular communication system with multiple subcarriers. It includes two units including respective functionalities for operation in the cell bandwidth and in the power-saving bandwidth. In particular, it comprises a cell-bandwidth operation unit 620 for operating on a cell bandwidth with a first number of subcarriers for receiving system information transmitted by a base station including information about the cell bandwidth; and a power-saving-bandwidth unit 610 for operating on a power-saving bandwidth with a second number of subcarriers smaller than the first number of subcarriers for receiving a physical control channel. The terminal also preferably includes an operation control unit 630 for switching between the operation of the cell-bandwidth operation unit and the operation of the power-saving-bandwidth unit, the operation including at least one of monitoring, reception or transmission of information. The terminal may be preconfigured to just perform particular operations in particular bandwidths. For instance, perform MIB and/or SIB monitoring and reception in the cell bandwidth and all other operations in the power-saving bandwidth.

It is noted that the hardware resources of the cell-bandwidth operation unit 620 and the power-saving-bandwidth unit 610 may (partially) overlap, be shared to a certain extent.

The terminal may further include a detection unit for detecting a downlink control information for uplink or downlink resource assignments, wherein when the terminal is in the power-saving bandwidth operation, the length of the assignment information is smaller than when the terminal is in the cell bandwidth operation. The detection unit may perform monitoring and blind detection of the predetermined resources on the control channel in order to detect resource assignments.

The terminal may further include a receiving unit 640 for receiving (decoding) an active bandwidth indicator and may be configured, when it is operating in the power saving bandwidth to change its operation to the cell bandwidth after having received the active band indicator. Alternatively or in addition, when the terminal is operating in the cell bandwidth it may be configured to change the operation to the power saving bandwidth after having received the active band indicator.

The active bandwidth indicator may be provided to the operation control unit (630), which is configured to switch the terminal operation bandwidth from the power-saving bandwidth to the cell bandwidth upon receiving the active bandwidth indicator. The active bandwidth indicator may be received on a physical downlink control channel and is preferably specific for a respective terminal 600.

The active bandwidth indicator may indicate for a terminal or a group of terminals at least one of: a command for the terminal or the group of terminals to change operation from the power saving bandwidth to cell bandwidth or vice versa; and/or downlink and/or uplink bandwidth for indicating the bandwidth on downlink and/or uplink, respectively, to which the terminal or the group of terminals shall change the operation.

The terminal may further comprise a transmitting unit for transmitting a positive or a negative acknowledgement depending on whether the receiving unit 640 successfully decoded the active bandwidth indicator.

The operation control unit is configured to switch to the power-saving bandwidth upon at least one of the following events finishing of connection establishment procedure for connecting the terminal to the communication network including configuring physical downlink control channel for the terminal; the end of a connection reconfiguration procedure; waking up from a discontinuous reception after inactivity time period or expiry of the inactivity timer in the discontinuous reception; and/or expiry of a predetermined time period.

The end of a connection establishment procedure can preferably be tied to the transmission of an RRCConnectionSetupComplete message in LTE like system, and, in general a message for indicating the completing of a connection setup for connecting a terminal to the network. The end of a reconfiguration establishment procedure can preferably be tied to the transmission of an RRCConnectionReconfigurationComplete message. Establishing connection and reconfiguring the connection relates to establishing signaling and/or data bearer between the terminal and the network.

The operation control unit is further configured to switch to the cell bandwidth upon at least one of the following events: start of connection establishment or connection reconfiguration procedure; start of a random access procedure; start of a handover procedure; and/or detection of an active bandwidth indicator.

Figure 7:
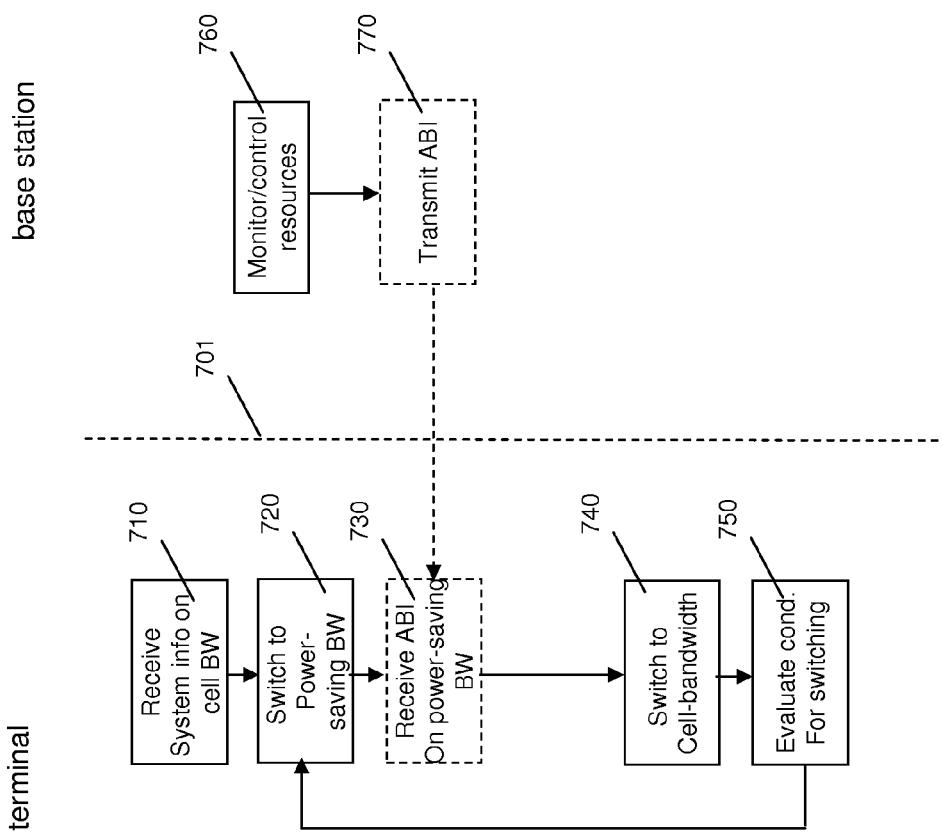
FIG. 7 is a flow diagram illustrating an example of a method to be performed at the receiver and at a transmitter operating in accordance with an embodiment of the present invention.

FIG. 7 illustrates an exemplary flow diagram of a method according to an embodiment of the present invention. In particular, at the terminal side, the terminal after being switched on, performs a cell search 710 in order to synchronize with the system timing and frequency and to determine the (downlink) cell bandwidth configuration. This corresponds to operating on a cell bandwidth with a first number of subcarriers for receiving system information transmitted by a base station including information about the cell bandwidth. After the cell-search (or after a predetermined event as described above), the UE switches 720 to the power-saving bandwidth, in which it operates using a second number of subcarriers smaller than the first number of subcarriers for receiving a physical control channel.

In general, the method performed by the terminal may include operating in a first bandwidth mode and after receiving the active band indicator to work in a second bandwidth mode, wherein the first and the second bandwidth mode are the power saving bandwidth operation and cell bandwidth operation, respectively, or vice versa.

The method may further include transmitting a positive or a negative acknowledgement depending on whether the active bandwidth indicator has been received (successfully decoded) or not.

The base station may monitor 760 the resource usage in the cell and as soon as it determines (judges) that the resources in the central bandwidth are busy and congestion may occur, it transmits 770 an ABI command to the terminal or a predefined group of terminals or to all terminals in the cell in order to instruct them to switch back to the cell bandwidth operation. Alternatively or in addition, step 760 can comprise to evaluate the traffic for or from at least a single UE, and judging whether the available resources within the power saving bandwidth are sufficient to transmit the available data with a single resource assignment; if it judges this not to be the case it transmits an ABI command to the terminal or a predefined group of terminals or to all terminals in the cell in order to instruct them to switch back to the cell bandwidth operation. The transmission over the channel 701 is received 730 by the terminal and the operation of the terminal is controlled accordingly. In particular, the UE switches 740 to the cell bandwidth. It is beneficial if the UE evaluates a condition 750 and reenters the power-saving bandwidth operation as soon as the condition is met. For instance, the condition may be a timer expiry or a certain event as described above. It may also be after an explicit enabling command from the base station, as by a MAC CE or due to other conditions such as starting a random access procedure, or start of a handover procedure, or start of a connection establishment or connection reconfiguration procedure.

The present invention is particularly advantageous for low-cost terminals and, especially, for the machine-communication terminals. However, it may be equally applied to any terminal in order to save its battery power.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

Summarizing, the present invention relates to a terminal and a base station, and to a receiving and transmitting method to be performed at the terminal and the base station, respectively. In particular, the present invention relates to power consumption reduction by providing two operation bandwidths for a terminal, one being a cell-bandwidth, a bandwidth in which the cell may operate and the other one is a bandwidth, lower than the cell-bandwidth and called power-saving bandwidth. The terminal may perform the initial cell search including reception of the system information in the cell bandwidth and perform other reception/transmission/monitoring operation(s) in the power-saving bandwidth. Accordingly, a low-cost terminal implementation is enabled, which is particularly advantageous for the machine communication terminals.

The invention claimed is:

1. A method for receiving signals in a cellular communication system with multiple subcarriers, the method being performed at a terminal and comprising the steps of:
   integrating a low-power consumption machine-type communication terminal in the cellular communication system, said low-power consumption machine-type communication terminal being configured to monitor sensor data in the cellular communication system;
   monitoring a physical control channel or a physical channel for uplink or downlink resource assignments in a power-saving bandwidth;
   operating on a cell bandwidth with a first number of subcarriers for initial terminal operations and for receiving system information transmitted by a base station including information about the cell bandwidth;
   operating on a power-saving bandwidth with a second number of subcarriers smaller than the first number of subcarriers for receiving a physical control channel or a physical channel conveying uplink or downlink resource assignments;
   receiving an active bandwidth indicator transmitted to the terminal from the base station;
   after receiving the active bandwidth indicator while operating in the power saving bandwidth, operating in the cell bandwidth or vice-versa.

2. The method according to claim 1 further comprising a step of:
   switching the operation of the terminal, for at least one of monitoring, reception or transmission of information, between the cell bandwidth and the power-saving bandwidth.

3. The method according to claim 1, further comprising the steps of:
   detecting a downlink control information for uplink or downlink resource assignments, wherein when the terminal is in the power-saving bandwidth operation, the length of the assignment information is smaller than when the terminal is in the cell bandwidth operation.

4. The method according to claim 1, wherein
   the active bandwidth indicator is received on a physical downlink control channel and is specific for a terminal or a group of terminals, and
   the active bandwidth indicator indicates at least one of:
     a command for the terminal or the group of terminals to change operation from the power saving bandwidth to cell bandwidth or vice versa;
     a command for the terminal or the group of terminals to operate on the power saving bandwidth or cell bandwidth;
     downlink and/or uplink bandwidth for indicating the bandwidth on downlink and/or uplink, respectively, to which the terminal or the group of terminals shall change the operation;
     downlink and/or uplink bandwidth for indicating to operate on the power saving bandwidth or cell bandwidth in downlink and/or uplink, respectively.

5. The method according to claim 2, wherein the step of switching to the power-saving bandwidth is performed upon at least one of the following events:
   finishing of connection establishment procedure for connecting the terminal to the communication network including configuring physical downlink control channel for the terminal;
   waking up from a discontinuous reception after inactivity time period or expiry of the inactivity timer in the discontinuous reception; and/or
   expiry of a predetermined time period.

6. A method for transmitting signals in a cellular communication system with multiple subcarriers, the method being performed at a base station and comprising the steps of:
   integrating a low-power consumption machine-type communication terminal configured to monitor sensor data in the cellular communication system;
   monitoring usage of resources in a cell of the communication system;
   in accordance with the monitoring, judging whether and/or which terminal shall operate on a cell bandwidth with a first number of subcarriers or on a power-saving bandwidth including a second number with a second number of subcarriers smaller than the first number of subcarriers, wherein the cell bandwidth is configured for transmitting system information including information about the cell bandwidth and the power-saving bandwidth is configured for transmitting physical control channel or physical channel conveying uplink or downlink resource assignments,
   transmitting an active bandwidth indicator to a terminal judged to switch from the power-saving bandwidth to the cell bandwidth.

7. An apparatus for receiving signals in a cellular communication system with multiple subcarriers, the apparatus being a low-power consumption machine-type communication terminal (600) and comprising:
   a cell-bandwidth operation unit (620) for operating on a cell bandwidth with a first number of subcarriers for initial terminal operations and for receiving system information transmitted by a base station including information about the cell bandwidth; and
   a power-saving-bandwidth unit (610) for operating on a power-saving bandwidth with a second number of subcarriers smaller than the first number of subcarriers for receiving a physical control channel or a physical channel conveying uplink or downlink resource assignments, wherein:

the terminal (600) switches between the cell bandwidth and the power-saving bandwidth when detecting an active bandwidth indicator transmitted to the terminal (600) from the base station.

8. The apparatus according to claim 7 further comprising:
an operation control unit (630) for switching between the operation of the cell-bandwidth operation unit and the operation of the power-saving-bandwidth unit, the operation including at least one of monitoring, reception or transmission of information.

9. The apparatus according to claim 7, further comprising:
a detection unit for detecting a downlink control information for uplink or downlink resource assignments, wherein when the terminal is in the power-saving bandwidth operation, the length of the assignment information is smaller than when the terminal is in the cell bandwidth operation.

10. The apparatus according to claim 8, further comprising:
a receiving unit (640) for receiving an active bandwidth indicator,
wherein the operation control unit (630), while operating in the power-saving bandwidth, is configured to operate in the cell bandwidth after receiving the active bandwidth indicator or vice-versa.

11. The apparatus according to claim 10, wherein the active bandwidth indicator is conveyed on a physical downlink control channel and is specific for a terminal (600) or a group of terminals, and
the active bandwidth indicator indicates at least one of:
  a command for the terminal or the group of terminals to change operation from the power saving bandwidth to cell bandwidth or vice versa;
  a command for the terminal or the group of terminals to operate on the power saving bandwidth or cell bandwidth;
  downlink and/or uplink bandwidth for indicating the bandwidth on downlink and/or uplink, respectively, to which the terminal or the group of terminals shall change the operation;
  downlink and/or uplink bandwidth for indicating to operate on the power saving bandwidth or cell bandwidth in downlink and/or uplink, respectively.

12. The apparatus according to claim 10, further comprising:
a transmitting unit for transmitting a positive or a negative acknowledgement depending on whether the receiving unit (640) successfully decoded the active bandwidth indicator.

13. The apparatus according to claim 8, wherein the operation control unit is configured to switch to the power-saving bandwidth upon at least one of the following events:
  finishing of connection establishment procedure for connecting the terminal to the communication network including configuring physical downlink control channel for the terminal;
  waking up from a discontinuous reception after inactivity time period or expiry of the inactivity timer in the discontinuous reception; and/or
  expiry of a predetermined time period.

14. A computer program product comprising a non-transitory computer-readable medium having a computer-readable program code embodied thereon is provided, the program code being adapted to carry out the steps of a method according to claim 1.

* * * * *